US011969081B2

(12) United States Patent
Dame et al.

(10) Patent No.: US 11,969,081 B2
(45) Date of Patent: Apr. 30, 2024

(54) CONNECTION ASSEMBLY FOR CONNECTING A SUPPORT MEMBER TO A WORK SURFACE AND CORRESPONDING METHOD

(71) Applicant: Quint Workspaces LLC, Petoskey, MI (US)

(72) Inventors: Paul G. Dame, Holland, MI (US); Anthony J. Sall, Grandville, MI (US); Joel Ruiter, Ada, MI (US); James E. Moon, Jr., Allegan, MI (US)

(73) Assignee: QUINT WORKSPACES LLC, Petoskey, MI (US)

( * ) Notice: Subject to any disclaimer, the term of this patent is extended or adjusted under 35 U.S.C. 154(b) by 26 days.

(21) Appl. No.: 17/512,395

(22) Filed: Oct. 27, 2021

(65) Prior Publication Data

US 2022/0125194 A1 Apr. 28, 2022

Related U.S. Application Data

(60) Provisional application No. 63/106,747, filed on Oct. 28, 2020.

(51) Int. Cl.
*A47B 3/06* (2006.01)
*A47B 13/00* (2006.01)
(Continued)

(52) U.S. Cl.
CPC ............ *A47B 13/003* (2013.01); *F16B 12/10* (2013.01); *F16B 12/44* (2013.01); *F16B 2012/446* (2013.01)

(58) Field of Classification Search
CPC . A47B 13/003; A47B 2230/07; A47B 13/021; F16B 12/10; F16B 12/44; F16B 2012/446; F16B 12/52
See application file for complete search history.

(56) References Cited

U.S. PATENT DOCUMENTS 3,063,765 A * 11/1962 Huff .................. F16B 12/52
248/188.8
3,079,120 A * 2/1963 Schwartz ............. A47B 13/021
248/188

(Continued)

FOREIGN PATENT DOCUMENTS

DE 19714131 A1 10/1998
EP 1211429 A1 6/2002
(Continued)

*Primary Examiner* — Amy J. Sterling
(74) *Attorney, Agent, or Firm* — REISING ETHINGTON P.C.

(57) ABSTRACT

A connection assembly for securing a support member to a work surface (e.g., a table leg to a table top) that includes an attachment plate, a retainer, and a fitting. The attachment plate connects to a bottom surface of the table top, the fitting connects to an upper end of the table leg, and the retainer exerts a force on the fitting that helps absorb or take up tolerances within the connection assembly so that the support member is securely connected to the work surface. In one example, the retainer is a resilient component that is compressed between the fitting and a receiving portion of the attachment plate to help take up tolerances within the connection assembly, whereas in another example the retainer is a rotatable component that exerts a force against the fitting to address tolerances and the like. A method for providing a connection assembly is also disclosed.

19 Claims, 13 Drawing Sheets

(51) Int. Cl.
*F16B 12/10* (2006.01)
*F16B 12/44* (2006.01)

(56) References Cited

U.S. PATENT DOCUMENTS

| | | | | |
|---|---|---|---|---|
| 3,131,899 | A * | 5/1964 | Luhrs | F16B 9/052 108/26 |
| 3,267,888 | A * | 8/1966 | Carlson | F16B 9/052 403/189 |
| 3,379,398 | A * | 4/1968 | Boccone | A47B 13/021 403/264 |
| 3,406,935 | A * | 10/1968 | Mutchnik | F16B 12/52 248/188 |
| 3,443,530 | A * | 5/1969 | Carlson | A47B 13/021 248/188.91 |
| 3,620,492 | A * | 11/1971 | Jennings | A47B 13/021 248/188 |
| 4,848,245 | A * | 7/1989 | Piretti | A47B 13/021 248/188.8 |
| 5,195,713 | A | 3/1993 | Van Dore et al. | |
| 5,934,203 | A * | 8/1999 | Glass | A47B 87/002 108/50.02 |
| 6,047,648 | A * | 4/2000 | Alm | A47B 13/021 108/157.16 |
| 6,119,989 | A | 9/2000 | Hollington et al. | |
| 6,435,112 | B1 | 8/2002 | Insalaco | |
| 6,481,169 | B1 | 11/2002 | Ludwig et al. | |
| D476,178 | S | 6/2003 | Schacht et al. | |
| 6,588,346 | B1 | 7/2003 | Bockheim et al. | |
| 6,588,355 | B1 | 7/2003 | Whitley, II et al. | |
| 6,925,945 | B2 * | 8/2005 | Babick | A47B 13/021 248/188 |
| D542,296 | S | 5/2007 | Bockheim et al. | |
| 7,551,432 | B1 | 6/2009 | Bockheim et al. | |
| D603,185 | S | 11/2009 | Bockheim et al. | |
| D610,829 | S | 3/2010 | Nelsen et al. | |
| D612,173 | S | 3/2010 | Kane | |
| 8,096,244 | B1 | 1/2012 | Bockheim et al. | |
| 8,205,950 | B1 | 6/2012 | Bockheim et al. | |
| D687,657 | S | 8/2013 | Ruiter et al. | |
| 9,402,473 | B2 * | 8/2016 | Cottrell | F16B 12/52 |
| 9,770,098 | B1 | 9/2017 | Holbrook | |
| 2002/0043183 | A1 | 4/2002 | Insalaco et al. | |
| 2002/0092448 | A1 | 7/2002 | Park | |
| 2003/0000153 | A1 | 1/2003 | Chesser et al. | |
| 2003/0221383 | A1 | 12/2003 | Rutan et al. | |
| 2003/0227237 | A1 | 12/2003 | Bockheim et al. | |
| 2005/0039642 | A1 | 2/2005 | Cornelius | |
| 2005/0268823 | A1 | 12/2005 | Bakker | |
| 2006/0010787 | A1 | 1/2006 | Hand et al. | |
| 2006/0179458 | A1 | 8/2006 | Schmieder et al. | |
| 2006/0278139 | A1 | 12/2006 | Korb | |
| 2007/0204771 | A1 | 9/2007 | Nagel et al. | |
| 2008/0149007 | A1 | 6/2008 | MacLean et al. | |
| 2008/0295745 | A1 | 12/2008 | Hamilton et al. | |
| 2008/0298926 | A1 | 12/2008 | Feuerstein | |
| 2009/0001859 | A1 | 1/2009 | Compton et al. | |
| 2009/0180830 | A1 | 7/2009 | Maclean | |
| 2009/0183656 | A1 | 7/2009 | Karrasch et al. | |
| 2009/0282663 | A1 | 11/2009 | Martin | |
| 2011/0101764 | A1 | 5/2011 | van Hekken et al. | |
| 2011/0140497 | A1 | 6/2011 | Fookes et al. | |
| 2011/0187164 | A1 | 8/2011 | Corcorran et al. | |
| 2011/0298339 | A1 | 12/2011 | Udagawa et al. | |
| 2012/0304902 | A1 | 12/2012 | Ruzicka | |
| 2013/0034409 | A1 | 2/2013 | Haworth et al. | |
| 2013/0284077 | A1 | 10/2013 | Copeland et al. | |
| 2013/0326976 | A1 | 12/2013 | Jeffers et al. | |
| 2014/0038164 | A1 | 2/2014 | Battey | |
| 2014/0060395 | A1 | 3/2014 | Ruiter et al. | |
| 2014/0062145 | A1 | 3/2014 | Iacovoni et al. | |
| 2014/0182229 | A1 | 7/2014 | Dame et al. | |
| 2014/0345502 | A1 | 11/2014 | Flanet | |
| 2014/0360412 | A1 | 12/2014 | Zaccai et al. | |
| 2014/0367538 | A1 | 12/2014 | Widholzer et al. | |
| 2015/0164219 | A1 * | 6/2015 | Korte | F16B 12/44 403/186 |
| 2015/0275513 | A1 | 10/2015 | Feldpausch et al. | |
| 2015/0351537 | A1 * | 12/2015 | Grabowski | A47B 13/021 24/303 |
| 2016/0003276 | A1 * | 1/2016 | Møller Hansen | A47B 95/00 403/116 |
| 2016/0316904 | A1 | 11/2016 | Harper | |
| 2016/0345724 | A1 | 12/2016 | White et al. | |
| 2017/0108022 | A1 * | 4/2017 | Gregory | F16B 3/00 |
| 2017/0354247 | A1 | 12/2017 | Matthai et al. | |
| 2017/0354253 | A1 | 12/2017 | Laarman et al. | |
| 2018/0080489 | A1 * | 3/2018 | Kil | F16B 12/48 |
| 2018/0295994 | A1 | 10/2018 | DeWeerd et al. | |
| 2019/0142155 | A1 | 5/2019 | Lee | |
| 2019/0360198 | A1 | 11/2019 | Matthai et al. | |
| 2019/0365091 | A1 | 12/2019 | Ruzicka et al. | |
| 2022/0265053 | A1 * | 8/2022 | Putnam | A47B 13/003 |

FOREIGN PATENT DOCUMENTS

| | | |
|---|---|---|
| EP | 1447023 A1 | 8/2004 |
| FR | 2510207 A1 | 1/1983 |
| JP | H08224130 A | 9/1996 |
| JP | H08277816 A | 10/1996 |
| JP | H11309021 A | 11/1999 |
| JP | 2000161321 A | 6/2000 |
| JP | 2003111619 A | 4/2003 |
| JP | 2005087244 A | 4/2005 |
| JP | 2006204772 A | 8/2006 |
| JP | 2006296820 A | 11/2006 |
| JP | 2006296822 A | 11/2006 |
| JP | 2010094396 A | 4/2010 |
| JP | 2010164100 A | 7/2010 |
| JP | 2013204735 A | 10/2013 |
| KR | 100797045 B1 | 1/2008 |

* cited by examiner

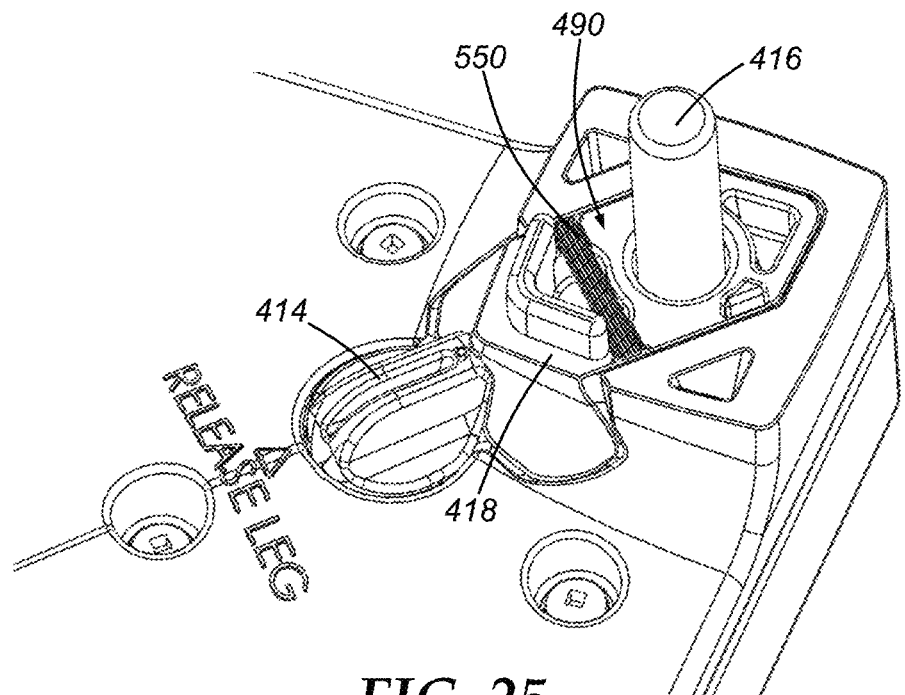
FIG. 25
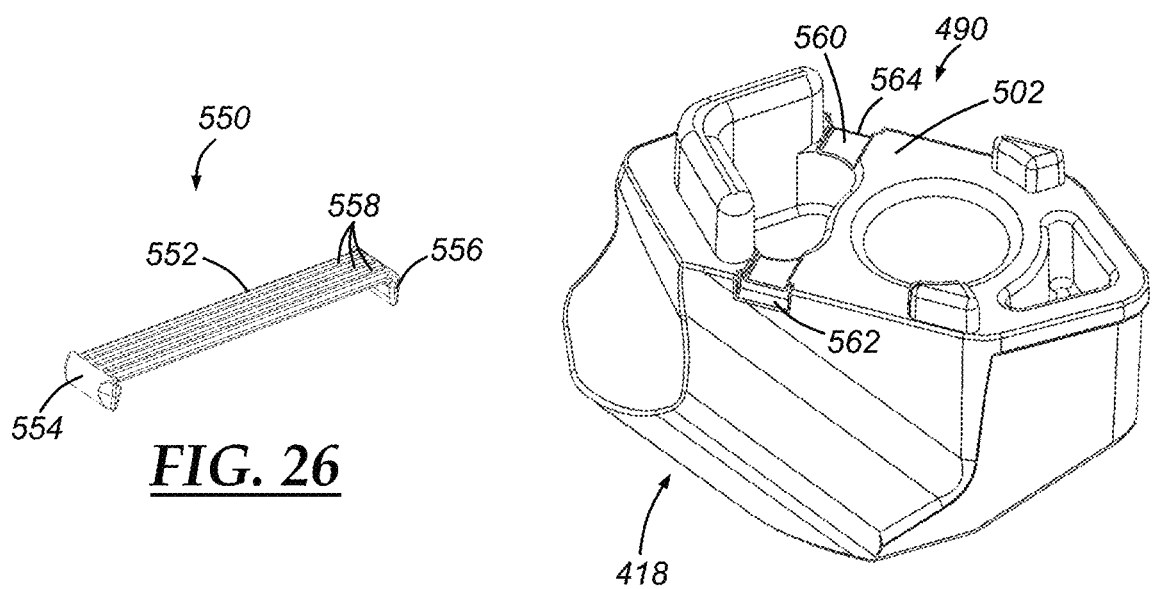
FIG. 26
FIG. 27

CONNECTION ASSEMBLY FOR CONNECTING A SUPPORT MEMBER TO A WORK SURFACE AND CORRESPONDING METHOD

FIELD

This application generally relates to a connection assembly for connecting a support member to a work surface and, more particularly, to a connection assembly for connecting a table leg to a table top or the like and a method for accomplishing the same.

BACKGROUND

Due to a combination of shipping, packaging, storage and/or cost constraints, tables and other pieces of furniture are oftentimes sold to customers in an unassembled or partially assembled state. In such cases, it may be up to the customer to perform some or all of the assembly steps in order to complete the assembly of the product. Support members, such as table legs, are frequently provided in an unassembled or unattached state such that the customer must connect the support members to a work surface, like the underside of a table top, before the product can be used.

Various types of connection assemblies have been developed over the years for connecting support members to work surfaces. These include assemblies that are somewhat complicated and require a considerable amount of time and/or tools to install, assemblies that may be easy to install but are not very sturdy or stable, as well as assemblies that may be sturdy but are not very economical to manufacture. A challenge commonly encountered in the development of connection assemblies involves tolerances, which are small, permissible variations in the physical dimensions and/or properties of components within the connection assembly. There are a number of different types of tolerances, including form tolerances, orientation tolerances, location tolerances, and run-out tolerances, to cite a few. Since no manufacturing equipment or process is perfectly precise, tolerances are present in virtually all manufactured products, particularly products like connection assemblies that are manufactured in large volumes at low costs. If not adequately addressed, the combined or cumulative impact of tolerances throughout the connection assembly, sometimes referred to as the tolerance stack-up, can cause the assembly to feel loose or unstable when the support member is attached to the work surface. Furthermore, these challenges can increase over time, particularly if the components in the connection assembly are subjected to reoccurring stresses, changes in temperature and/or other environmental factors, etc.

Thus, there may be a need to provide a connection assembly for connecting a support member to a work surface that can address and overcome some combination of the drawbacks and challenges noted above.

SUMMARY

In accordance with one embodiment, there is provided a connection assembly for connecting a support member to a work surface, comprising: an attachment plate that includes a plate portion and a receiving portion, the plate portion is configured for attachment to the work surface; a fitting that includes a top side and a bottom side, the top side is received by the receiving portion of the attachment plate and the bottom side is configured for attachment to the support member; and a retainer that is at least partially located between the attachment plate and the fitting, wherein the retainer exerts a force on the fitting that helps absorb or take up tolerances within the connection assembly so that the support member is securely connected to the work surface.

In accordance with various embodiments, the connection assembly may have any one or more of the following features, either singly or in any technically feasible combination:

- the plate portion is a flat plate that includes a plurality of through-holes for fasteners that attach the attachment plate to a bottom surface of the work surface, one or more of the plurality of through-holes are located at one or more corners of the plate portion;
- the receiving portion is a boss-like feature that protrudes from the plate portion and includes a plurality of walls that receive the top side of the fitting;
- the receiving portion further includes an exterior portion located outside the plurality of walls, an interior portion located inside the plurality of walls, and a recessed portion that forms an opening in at least one of the plurality of walls and provides access between the exterior and interior portions;
- the exterior portion includes an exterior ramping surface that is inclined to facilitate sliding insertion of at least one of the fitting or the retainer through the recessed portion and into the interior portion;
- the plurality of walls include a first wall that is aligned with a first peripheral surface of the plate portion and includes a first end and a second end, a second wall that is aligned with a second peripheral surface of the plate portion and includes a first end and a second end, a third wall that is aligned at an angle to the first wall and includes a first end, and a fourth wall that is aligned at an angle to the second wall and includes a first end, the first end of the first wall is connected to the first end of the second wall, the second end of the first wall is connected to the first end of the third wall, the second end of the second wall is connected to the first end of the fourth wall, and the recessed portion is located between the third and fourth walls;
- the interior portion includes a through-hole for a fastener that attaches the attachment plate to a bottom surface of the work surface, the through-hole is located at an outside corner of the attachment plate and has a center axis that is generally co-axial with a center axis $A_{TL}$ of the support member;
- the plurality of walls include a first inner wall with a notched surface and a second inner wall with a notched surface, the notched surface of the first inner wall opposes the notched surface of the second inner wall across at least part of the interior portion so that corresponding slots are formed, the slots facilitate sliding insertion of at least one of the fitting or the retainer;
- the exterior portion includes an opening that rotatably receives the retainer to facilitate rotation of the retainer between locked and unlocked positions;
- the recessed portion is merged with the opening to create a combined opening that includes both a gap in one or more of the plurality of walls of the receiving portion and a through-hole in the plate portion, the through-hole in the plate portion allows the retainer to rotate and the gap in the one or more walls allows the retainer to contact and exert the force on the fitting that helps absorb or take up tolerances within the connection assembly;

the retainer includes a cross-piece and a retaining tab, the retaining tab is resiliently connected to the cross-piece so that it can flex or rotate about a retaining tab pivot point when the support member is attached to the work surface, which in turn applies a spring force within the connection assembly that helps absorb or take up tolerances within the connection assembly so that the support member is securely connected to the work surface;

the retainer further includes a first prong and a second prong, the first and second prongs are connected to the cross-piece and insert into corresponding slots within the receiving portion of the attachment plate so that the receiving portion retains the retainer;

one of the fitting or the retainer has a locking portion in the form of a projection and the other of the fitting or the retainer has an undercut, when the retainer is in the locked position the locking portion engages the undercut and causes the top side of the fitting to be pressed tightly into the receiving portion of the attachment plate so that the support member is securely connected to the work surface, and when the retainer is in the unlocked position the locking portion does not engage the undercut and allows the support member to be released from the work surface;

the retainer is a rotatable knob and includes a base portion, the base portion has a circular cross-sectional shape and is rotatably mounted within an opening in the attachment plate so that it can rotate between the locked and unlocked positions;

the retainer is a rotatable knob and includes an engagement portion, the engagement portion has a slotted feature for receiving a coin or the like so that a user can more easily rotate the retainer between the locked and unlocked positions;

the retainer is a rotatable knob and includes the locking portion, the locking portion is a lobe or projection that extends outwardly from the retainer and includes a cam surface that slides across a cam follower surface on the fitting;

the fitting includes a through-hole for a fastener that connects the fitting to the support member and has a first center axis, the receiving portion of the attachment plate includes a through-hole for a fastener that attaches the attachment plate to an underside of the work surface and has a second center axis, and the first center axis is generally co-axial with the second center axis;

the bottom side of the fitting includes a protuberance that extends from the bottom side, the protuberance is configured to fit into a corresponding cavity in an end of the support member;

the top side of the fitting includes a first flange and a second flange, the first and second flanges insert into a slot within the receiving portion of the attachment plate so that the receiving portion retains the fitting;

the top side of the fitting includes an exterior contour that is complementary in size and shape to an interior contour of the receiving portion of the attachment plate so that the fitting tightly nests within the receiving portion;

the fitting includes an undercut that is sized and shaped to receive a locking portion of the retainer so that when the retainer is in a locked position the locking portion nests within the undercut and prevents the fitting from becoming displaced from the receiving portion of the attachment plate;

a stability enhancement element that is interposed between two components in the connection assembly and reduces rattles, vibrations and/or noises therebetween;

the stability enhancement element is made from a plastic material and includes a center span and at least one side attachment on an end of the center span, one of the two components in the connection assembly includes a channel that is sized and shaped to receive the stability enhancement element and an edge, the center span extends in the channel so as to avoid negatively interfering with the connection between the two components, and the side attachment grasps on to the edge to help maintain the stability enhancement element in place;

the connection between the support member and the work surface is a fixed-leg connection, as opposed to a foldable connection, and the connection assembly is configured so that the support member can be released from the work surface without the use of any tools; and an assembly kit, comprising: a support member in the form of a table leg; a work surface in the form of a table top; and the connection assembly of claim 1, wherein the attachment plate is attached to an underside of the table top with a plurality of screws and the fitting is attached to a top surface of the table leg with a fastener.

In accordance with another embodiment, there is provided a connection assembly for connecting a support member to a work surface, comprising: an attachment plate that includes a plate portion and a receiving portion with an opening, the plate portion is configured for attachment to the work surface; a fitting that includes a top side and a bottom side, the top side is received by the receiving portion of the attachment plate and the bottom side is configured for attachment to the support member; and a retainer that is rotatably installed within the opening of the attachment plate so as to rotate between locked and unlocked positions, wherein one of the fitting or the retainer has a locking portion in the form of a projection and the other of the fitting or the retainer has an undercut, when the retainer is in the locked position the locking portion engages the undercut and causes the top side of the fitting to be pressed into the receiving portion of the attachment plate so that the support member is securely connected to the work surface, and when the retainer is in the unlocked position the locking portion does not engage the undercut and allows the support member to be released from the work surface.

In accordance with another embodiment, there is provided a method of providing a connection assembly to connect a support member to a work surface, the connection assembly includes an attachment plate with a plate portion and a receiving portion, a fitting with a top side and a bottom side, and a retainer, the method comprising the steps of: attaching the plate portion of the attachment plate to the work surface; attaching the bottom side of the fitting to the support member; providing a user with the attachment plate already attached to the work surface; providing a user with the fitting already attached to the support member, wherein the top side of the fitting is configured for installation into the receiving portion of the attachment plate; and providing a user with the retainer, wherein the retainer is configured for exerting a force on the fitting once the top side is installed into the receiving portion that helps absorb or take up tolerances within the connection assembly so that the support member can be securely connected to the work surface.

In accordance with various embodiments, the method may have any one or more of the following steps, either singly or in any technically feasible combination:

the step of providing a user with the retainer further comprises providing a resilient retainer with a retaining tab that is configured to be: manually engaged so that the top side of the fitting can be installed within the receiving portion of the attachment plate, and manually disengaged so that the retainer can exert a spring force on the fitting that helps absorb or take up tolerances within the connection assembly;

the step of attaching the plate portion of the attachment plate to the work surface further includes installing the retainer in an opening in the plate portion, and the step of providing a user with the retainer further comprises providing a rotatable knob with a locking portion that is configured to rotate between: an unlocked position so that the top side of the fitting can be installed within the receiving portion of the attachment plate, and a locked position where the locking portion engages an undercut on the fitting so that the retainer can exert a force on the fitting that helps absorb or take up tolerances within the connection assembly; and the connection assembly is configured so that the user can install the top side of the fitting into the receiving portion of the attachment plate and can cause the retainer to exert the force on the fitting without the use of any tools.

DRAWINGS

Examples and preferred embodiments will hereinafter be described in conjunction with the appended drawings, wherein like designations denote like elements, and wherein.

Figure 18:
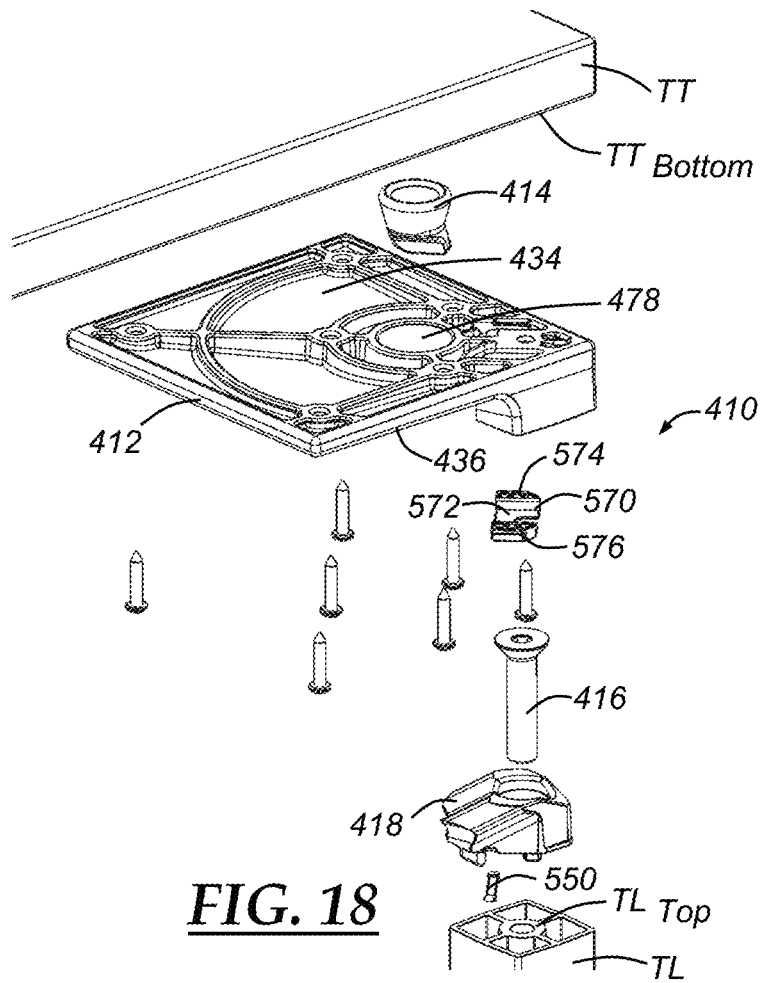
FIG. 18 is an exploded isometric view of a second example of a connection assembly.
Figure 19:
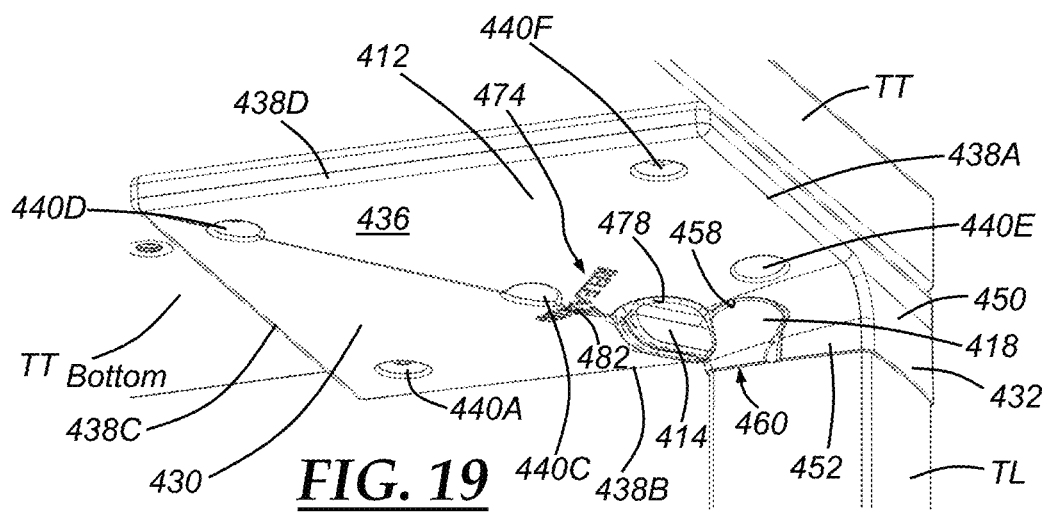
FIG. 19 is an isometric view of an attachment plate that may be used with the connection assembly of FIG. 18.
Figure 24:
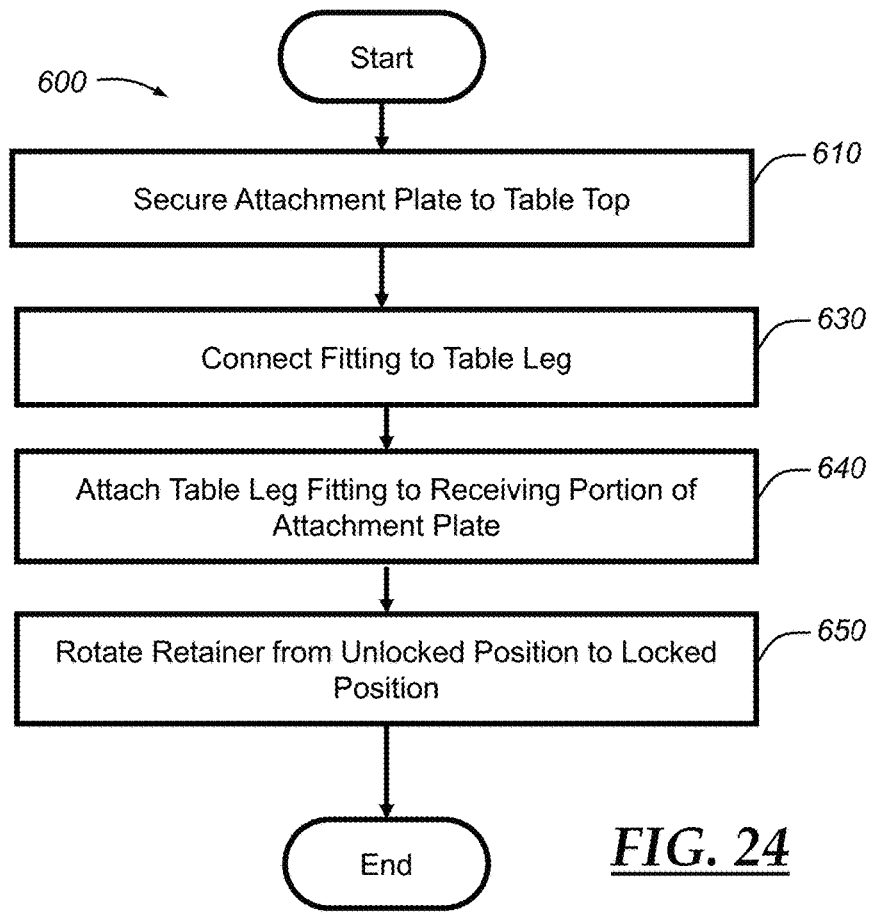
Figure 22A:
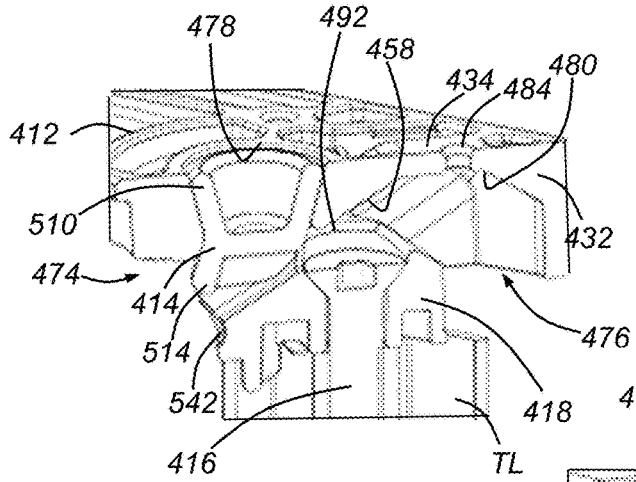
Figure 22B:
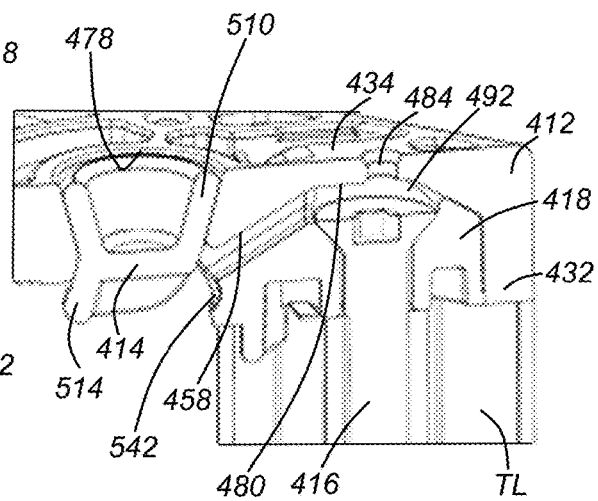
Figure 22C:
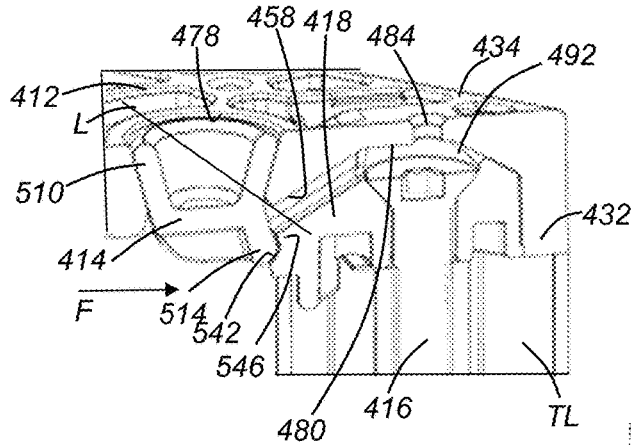
Figure 23:
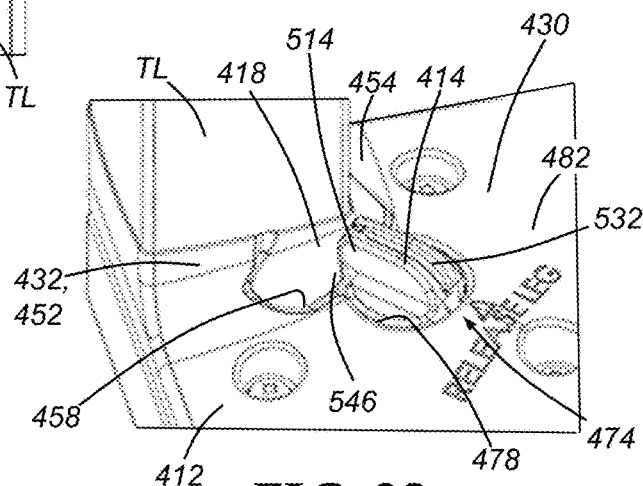
Figure 28:
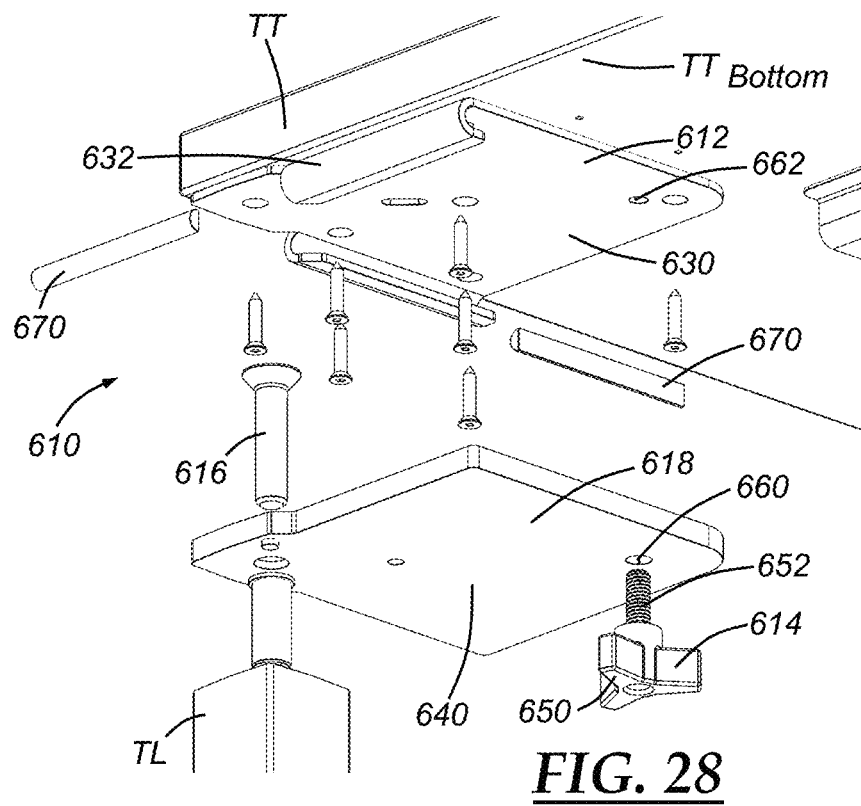
Figure 29:
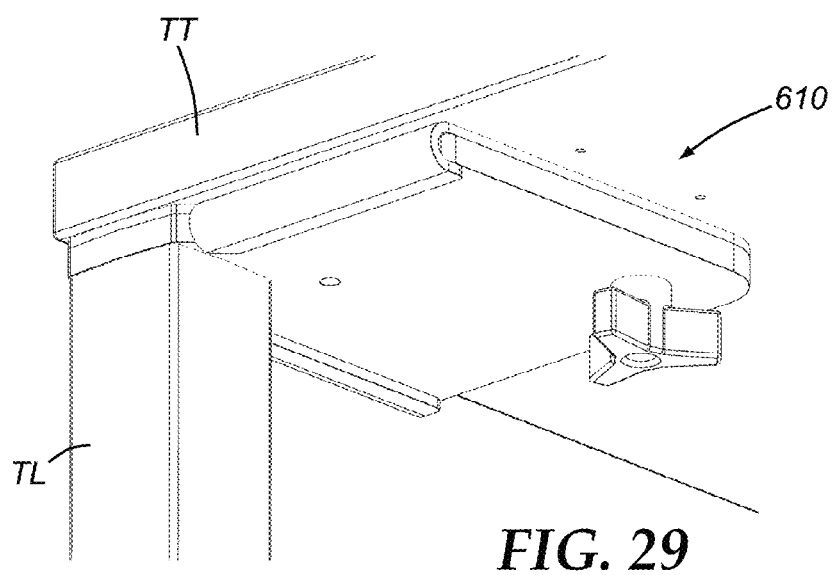
Figure 30:
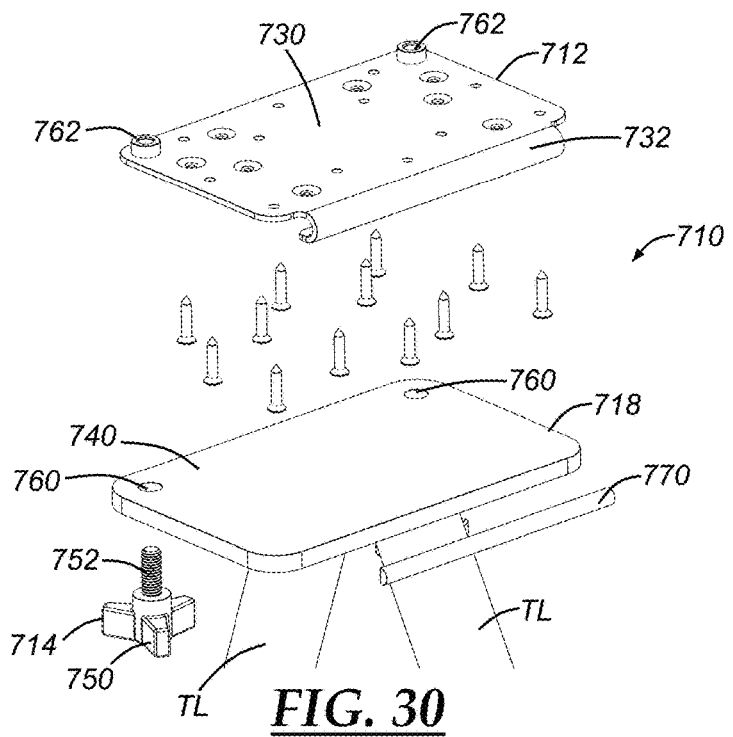
Figures 31A, 31B, 31C:
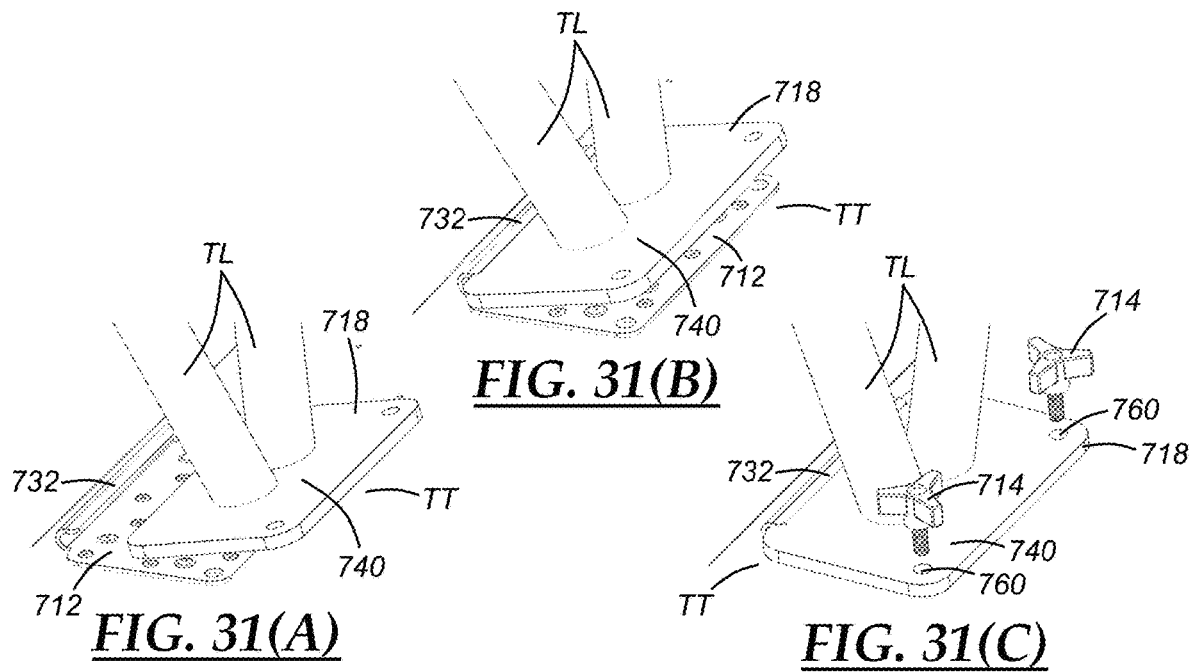

FIGS. 22A-22C are sectional views of the connection assembly of FIG. 18 in different positions, FIG. 22A shows the connection assembly in an unlocked position with the table leg and fitting being removed, FIG. 22B shows the connection assembly in an unlocked position with the table leg and fitting nested within a receiving portion of the attachment plate, and FIG. 22C shows the connection assembly in a locked position;

FIG. 23 shows the connection assembly in a locked position where the retainer is rotated to a locked position, the connection assembly is upside down in FIG. 23 to illustrate certain features;

FIG. 24 is a flowchart that shows the steps of a second method for connecting a support member to a work surface, such as connecting a table leg to a table top;

FIG. 25 shows the connection assembly in a locked position where the retainer is rotated to a locked position and a stability enhancement element has been added, the connection assembly is upside down in FIG. 25 to illustrate certain features;

FIG. 26 is an isometric view of a stability enhancement element that may be used with the connection assembly of FIG. 25;

FIG. 27 is an isometric view of a fitting that may be used with the connection assembly of FIG. 25, the fitting is upside down in FIG. 27 to illustrate certain features;

FIG. 28 is an exploded isometric view of a third example of a connection assembly;

FIG. 29 is an isometric view of the connection assembly of FIG. 28, where the connection assembly has been installed on a table;

FIG. 30 is an exploded isometric view of a fourth example of a connection assembly; and FIGS. 31(A)-31(C) are isometric views of the connection assembly of FIG. 30 being installed, the connection assembly is upside down in FIGS. 31(A)-31(C) to illustrate certain features.

DESCRIPTION

Disclosed herein is a connection assembly for securing a support member to a work surface (e.g., a table leg to a table top) that is convenient and easy to install, is structurally sturdy and stable, and is economical to manufacture. According to at least one embodiment, the connection assembly includes a fitting that connects to an end of a table leg and an attachment plate that is screwed to the underside of a table top. With the help of a retainer, the fitting can be inserted into a receiving portion of the attachment plate so that the table leg, fitting, retainer, attachment plate and table top are all securely fastened to one another. It is possible to provide a user with a connection assembly kit to simplify the assembly or installation process, where the fitting is already inserted and fastened to an end of the table leg, the retainer is already installed with the attachment plate, and the attachment plate is already screwed to the underside of the table top. In such a scenario, the user may simply connect the table leg to the table top by grasping the table leg and maneuvering the fitting so that it slides into the receiving portion of the attachment plate. In one example, the retainer is a resilient component that is compressed between the fitting and the receiving portion to help take up tolerances within the connection assembly, whereas in another example the retainer is a rotatable component that exerts a force against the fitting to address tolerances and the like. Other examples are provided as well. The connection assembly described herein may provide a "fixed leg" connection (i.e., a connection where the support member is in a fixed position relative to the work surface, as opposed to being foldable or pivotable), it may form a "snap-fit" connection between the support member and the work surface (i.e., a mechanical connection that snaps into place through interlocking components), and it may be accomplished without the user having to employ any tools. Other examples and features are certainly possible and are envisioned by the present application.

Figure 1:
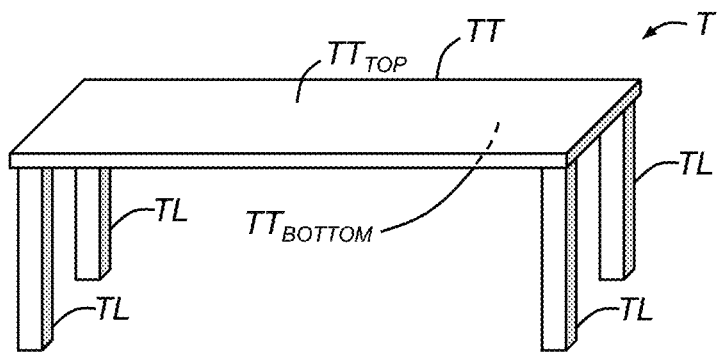
FIG. 1 is an isometric view of a table with which the connection assembly of the present application may be used.

With reference to FIG. 1, there is shown a first example of a table T that includes a table top TT having a top surface $TT_{TOP}$ and a bottom surface $TT_{BOTTOM}$, as well as four table legs TL. In the illustrated embodiment, the table top TT is rectangular and is generally flat or planar with a flat underside constituted by the bottom surface $TT_{BOTTOM}$ and a flat topside constituted by the top surface $TT_{TOP}$. Each of the table legs TL may be an elongated support member that has a square or rectangular cross-section and is connected to the bottom surface $TT_{BOTTOM}$ of the table top TT. As will be discussed below, the connection assembly may be used for easily and securely connecting each of the table legs TL to the bottom surface $TT_{BOTTOM}$ of the table top TT. Each of the table legs TL may include a top surface $TL_{TOP}$ that is located at one axial end of the table leg (FIG. 2) so that it is generally disposed within a plane that is perpendicular to a center axis $A_{TL}$ of the table leg TL. The table T may be made of any suitable combination of materials, including wood, plastic, metal, particle board, composite materials, glass, etc. In one embodiment, the table T is comprised of a combination of materials, such as metal (e.g., aluminum-based metals, steels, etc.), wood and plastic—for example, the table legs TL may be made of metal, wood or plastic, the table top TT may be made of wood or a manufactured material like particle board, and one or more components of the connection assembly may be made of metal or plastic. It should be appreciated that the present connection assembly may be used with various other pieces of furniture, not just with tables having rectangular table tops and four table legs. For example, the connection assembly may be used with: square, oval, circular and/or other shaped table tops; tables having more or less than four table legs, such as ones with a single support member towards the center of the table; fixed-height and adjustable-height tables; tables where the table legs are perpendicular to the table top, as well as table legs that are angled with respect to the table top; and pieces of furniture other than standard tables, such as coffee tables, sofa tables, dining tables, desks, book cases, chairs, stools, couches or sofas, benches, night stands, shelving units, file cabinets, etc., to cite a few possibilities. The following connection assembly examples are provided in the context of a table having a table top and multiple table legs, but the connection assembly of the present application is not limited to such and may be used with any number of different pieces of furniture, not just tables.

The term "support member," as used herein, broadly includes any type of member or part that provides support within a piece of furniture including, but not limited to, all types of legs, pedestals, supports and/or frames for tables, desks, book cases, chairs, stools, couches or sofas, benches, night stands, shelving units, file cabinets, etc. The term "work surface," as used herein, broadly includes any type of surface, panel, board or part that is supported within a piece of furniture including, but not limited to, all types of table tops, desk tops, seating surfaces, back rests, shelving surfaces, storage surfaces, frames, etc.

Figure 2:
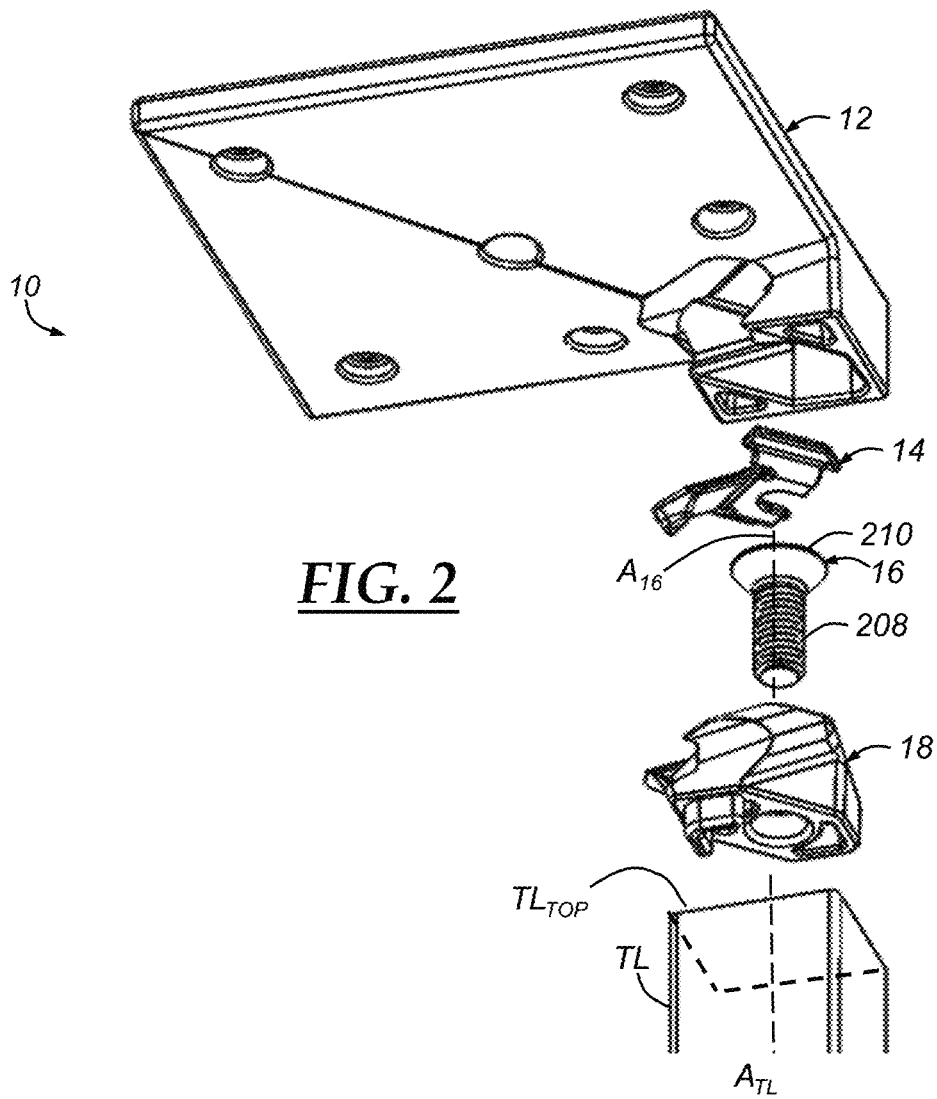
FIG. 2 is an exploded isometric view of a first example of a connection assembly.

With reference to FIG. 2, there is shown an exploded view of a first example of a connection assembly 10. The connection assembly 10 may be used to connect one or more of the table legs TL to the bottom surface $TT_{BOTTOM}$ of the table top TT. The table T may include, for example, four connection assemblies 10, one for each support member or table leg TL attached at a different corner of the work surface or table top TT. The connection assembly 10 may include an attachment plate 12, a retainer 14, a fastener 16, and a fitting 18. In the illustrated example, the attachment plate 12 is to be connected to the bottom surface or underside $TT_{BOTTOM}$ of the table top TT and the fitting 18 is to be connected to the top surface or upper end $TL_{TOP}$ of the table leg TL, with the rest of the connection assembly components being generally located therebetween. Unless stated otherwise, terms denoting orientation, such as top, bottom, upper, lower, etc., generally refer to the orientations shown in FIGS. 1 and 2, 18 and 19, 28 and 29, and 30, which are the orientations the connection assembly typically is in once it has been installed in a piece of furniture. These terms are not meant to be limiting, but rather are provided to give the reader a general frame of reference or sense or orientation; other orientations are certainly possible and are covered by the present application.

Figure 3:
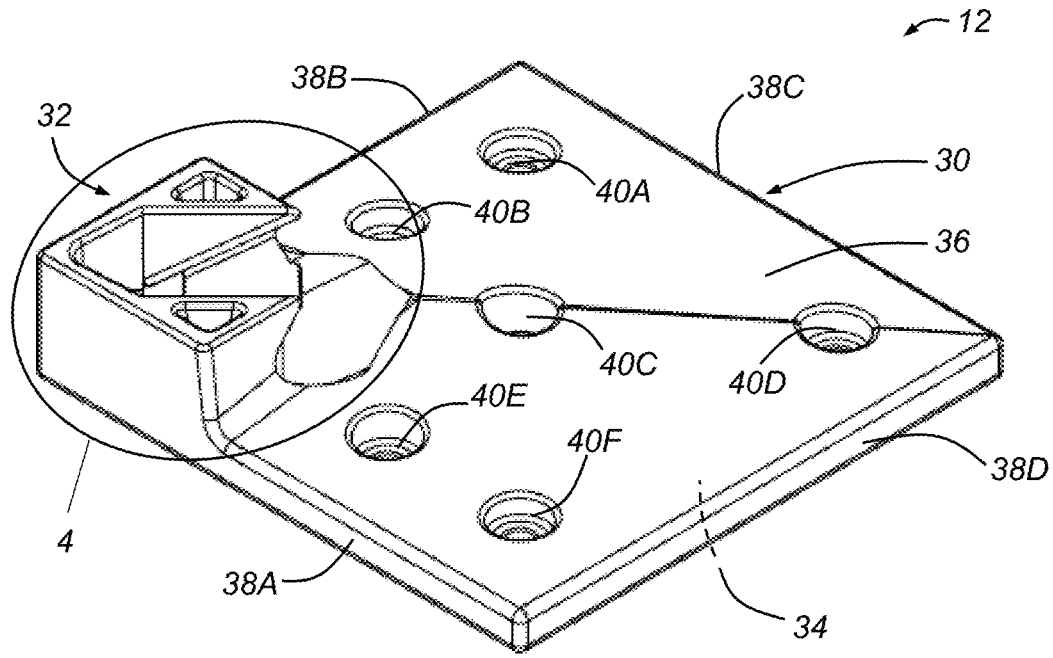
FIG. 3 is an isometric view of an attachment plate that may be used with the connection assembly of FIG. 2, the attachment plate is upside down in FIG. 3 to illustrate certain features.
Figure 4:
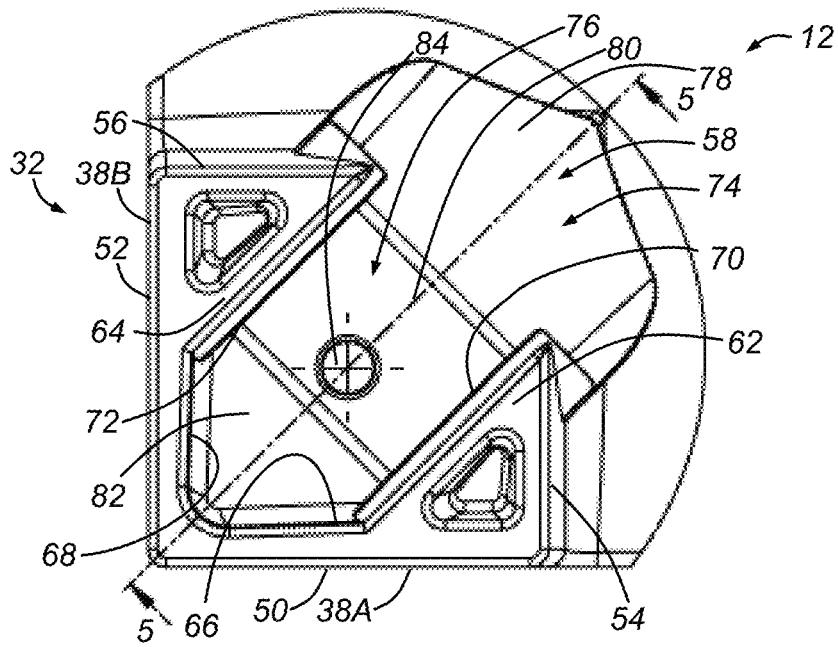
FIG. 4 is a top view of a receiving portion that is part of the attachment plate of FIG. 3.

With reference to FIGS. 3-6, there are shown several different views of the attachment plate 12, which is a flat plate that is screwed or otherwise attached to the bottom side $TT_{BOTTOM}$ of the work surface or table top TT in such a way that it can securely receive the top surface $TL_{TOP}$ of the support member or table leg TL. The attachment plate 12 may be comprised of a plastic or resin material, a metal or metal alloy, or any other suitably strong material (according to some non-limiting examples, the attachment plate 12 can be cast from of an aluminum-based or a zinc-based material, or it can be laser cut and machined from one or more steel plates or layers that are then attached to one another in a multi-layer form). The attachment plate 12 generally includes a plate portion 30 and a receiving portion 32. The plate portion 30 has an upper surface 34, a lower surface 36, and four peripheral surfaces 38A-D (again, the terms "upper" and "lower" generally pertain to the orientation shown in FIGS. 1 and 2; the orientations shown in FIGS. 3 and 4 are upside down to illustrate features on the underside of the attachment plate 12). The upper surface 34 and the lower surface 36 may be square- or rectangular-shaped and are generally parallel to one another so that, when attached to a table, the upper surface 34 faces the bottom side $TT_{BOTTOM}$ of table top TT and the lower surface 36 faces the ground. As used herein, "generally parallel" means less than 10° of deviation from parallelism or from being parallel. The plate portion 30 may include a number of counter-sunk or counter-bored through-holes 40A-F, each of which extends entirely through the plate portion 30 so that a screw or bolt may pass through the through-hole and secure the attachment plate 12 to the bottom surface $TT_{BOTTOM}$ of the work surface or table top TT. Plate portions having different sizes, shapes, numbers and/or locations of through-holes, etc. may be used instead.

The receiving portion 32 is a boss-like feature that protrudes or extends from the lower surface 36 of the plate portion 30 so that it can receive the top surface $TL_{TOP}$ of the support member or table leg TL. The receiving portion 32 may include a flange or rim that is integrally formed with the plate portion 30 (e.g., machined, molded, cast and/or additive manufactured (e.g., 3D printed) from the same material) and can be located at a corner of the attachment plate 12, such as an outside corner formed by the first and second peripheral surfaces 38A, 38B, although this is not required. The receiving portion 32 is generally defined by a first wall 50, a second wall 52, a third wall 54, a fourth wall 56, and a recessed portion 58, where the various walls 50-56 make up a raised perimeter for the receiving portion 32 and the recessed portion 58 provides an opening or slot 60 in the raised perimeter for the retainer 14 and/or fitting 18 to be inserted, as will be described. The first wall 50, the second wall 52, the third wall 54, and the fourth wall 56 extend away from the lower surface 36 of the plate portion 30 in a direction that is generally perpendicular to the plane in which the lower surface 36 resides. As used herein, "generally perpendicular" means less than 10° of deviation from being perpendicular. The recessed portion 58 may be recessed or sunken relative to the lower surface 36 of the plate portion 30.

The first wall 50 is aligned with the first peripheral surface 38A of the plate portion 30 and the second wall 52 is aligned with the second peripheral surface 38B of the plate portion 30, and a first end of each of the first wall 50 and the second wall 52 meet at a corner and are disposed generally perpendicular to one another. A second end of the first wall 50 is connected to a first end of the third wall 54, which extends generally perpendicular to the first wall 50. Likewise, a second end of the second wall 52 is connected to a first end of the fourth wall 56, which extends generally perpendicular to the second wall 52. The first wall 50 and the second wall 52 are approximately twice as long as the third wall 54 and the fourth wall 56 when viewing the attachment plate 12 in a plan or top view (best shown in FIG. 4, which is only a partial view of the attachment plate). Also, in the illustrated embodiment, a second end of the third wall 54 is connected to a middle portion of the first wall 50 by a first inner wall 62 which runs at a diagonal angle, and a second end of the fourth wall 56 is connected to a middle portion of the second wall 52 by a second inner wall 64 which also extends at a diagonal angle. The first wall 50 and the second wall 52 each include an inward-facing surface 66, 68, respectively, and the first inner wall 62 and the second inner wall 64 each include an inward-facing surface 70, 72, respectively, that are generally parallel to one another. Triangular cavities may be formed between walls 50, 54 and 62 and between walls 52, 56 and 64, as shown in the drawings.

Figure 5:
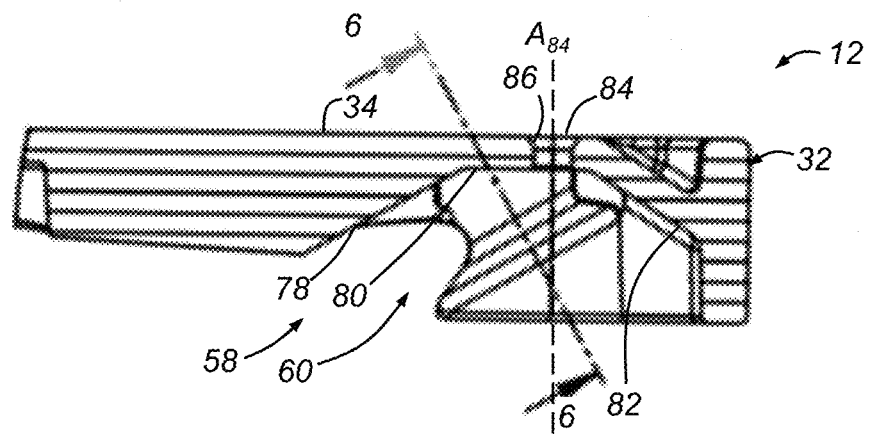
FIG. 5 is a sectional view of the receiving portion of FIG. 4 cut along line 5-5.

The recessed portion 58 is an opening or gap in the receiving portion 32 and provides access between an exterior portion 74 that is disposed outside of the walls 50-56 and an interior portion 76 that is disposed inside of the walls 50-56. The exterior portion 74 includes an exterior ramping surface 78 that is an inclined or sloped surface extending from the lower surface 36 of the plate portion 30 to a surface 80 of the interior portion 76 and is designed to facilitate the sliding insertion of the retainer 14 and/or the fitting 18. As best shown in FIG. 5, the exterior ramping surface 78 may be inclined at an angle between 20°-40°, inclusive, or, even more preferably, between 25°-35°, inclusive, (e.g., about 29°) relative to the plane in which the upper surface 34 of the plate portion 30 resides. The interior portion 76 includes the surface 80 and an interior ramping surface 82 that is an inclined or sloped surface extending from the surface 80 toward first and second walls 50, 52. The surface 80 is generally parallel to the upper surface 34 and/or the lower surface 36 of the plate portion 30. According to one example, the surfaces 80, 82, the exterior ramping surface 78, along with the four inward-facing surfaces 66-72 and the recessed portion 58 define the slot 60.

Figure 16:
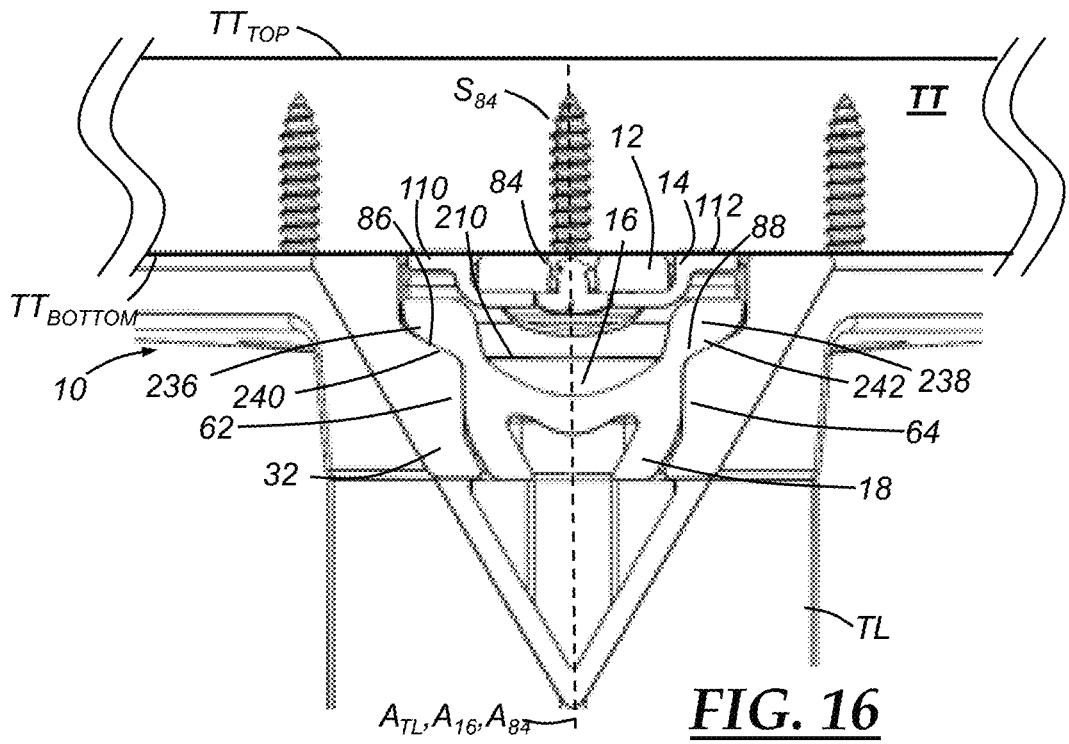
FIG. 16 is a sectional view of the connection assembly in FIG. 2, the connection assembly is attached to the underside of a table top in FIG. 16.

The interior portion 76 also includes a through-hole 84 that extends completely through the attachment plate 12, from the surface 80 to the upper surface 34. The through-hole 84 is defined by a cylindrically-shaped surface 86, which may be smooth (as shown in the illustrated embodiment) or threaded. A fastener $S_{84}$ (FIG. 16), such as a screw or bolt, may be inserted through the through-hole 84 and into the table top TT so as to secure the attachment plate 12 to the work surface or table top TT in the area of the receiving portion 32. According to one embodiment, the through-hole 84 is located in the surface 80 so that a center axis $A_{84}$ of the through-hole 84 is aligned and is generally co-axial with the center axis $A_{TL}$ (FIG. 2) of the support member or table leg TL when it is secured to the table top TT via the connection assembly 10 (FIG. 16). As used herein, "generally co-axial" means two or more axes that are "generally parallel" to one another and that are offset or shifted from one another by a distance of 15 mm or less when assembled (e.g., in the cross-section of FIG. 16, the three axes $A_{84}$, $A_{TL}$ and $A_{16}$ are "generally co-axial" if they are generally parallel to one another and if they are laterally shifted from one another by 15 mm or less within the assembly). The co-axial alignment regarding center axes $A_{84}$, $A_{TL}$ can help distribute and/or transfer forces or loads exerted on the table leg TL to the table top TT via the connection assembly 10 so that the holding strength of the assembly is improved and separation between the attachment plate 12 and the table top TT is prevented. It is possible for the center axes $A_{84}$, $A_{TL}$ to be slightly shifted from one another (i.e., not exactly co-axial, but generally co-axial) where the center axis $A_{84}$ of the through-hole 84 is still within the footprint of the table leg TL when it is installed in the receiving portion 32 of the attachment plate 12. Put differently, the through-hole 84 may be positioned such that when the table leg TL is installed, the top surface $TL_{TOP}$ of the table leg TL covers the through-hole 84, even if the two center axes are not exactly co-axial. This arrangement may also improve the holding strength of the connection assembly 10.

Figure 6:
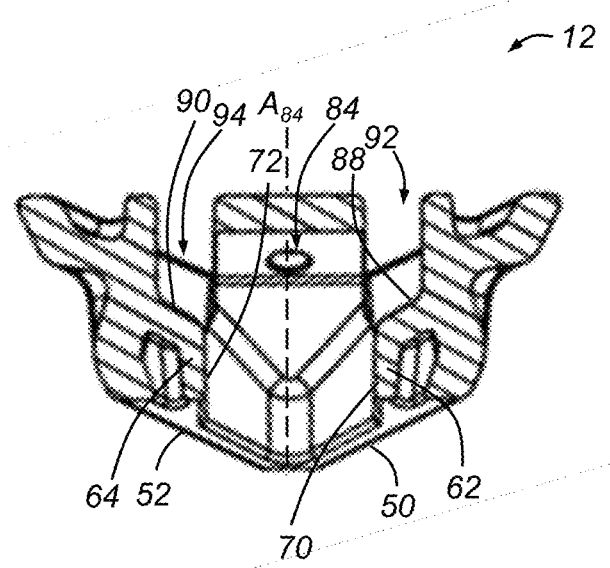
FIG. 6 is a sectional view of the receiving portion of FIG. 5 cut along line 6-6.

As is best shown in FIG. 6, the first and second inner walls 62 and 64 are arranged so that their respective inward-facing surfaces 70 and 72 face one another in a generally parallel manner. The first and second inner walls 62 and 64 may also include notched surfaces 88 and 90, respectively, formed into the inward-facing surfaces 70 and 72 so that corresponding slots or channels 92, 94 are formed on opposing sides of the interior portion 76. These slots or channels 92, 94 are configured for receiving prongs (e.g., prongs 110, 112 (FIGS. 7-8)) of the retainer 14 and provide the receiving portion 32 with channels so that the retainer 14 and/or fitting 18 can be slid or otherwise inserted into place.

Figure 7:
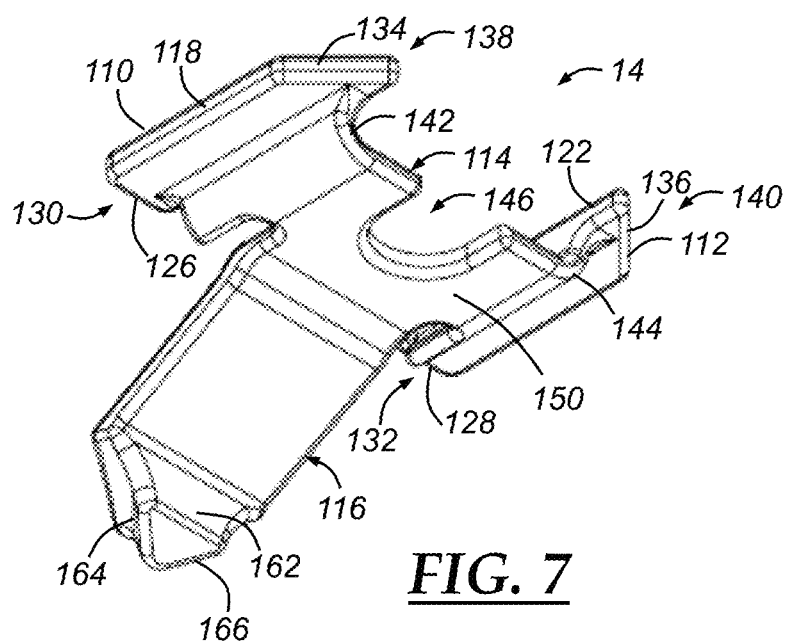
FIG. 7 is an isometric view of a retainer that may be used with the connection assembly of FIG. 2.
Figure 8:
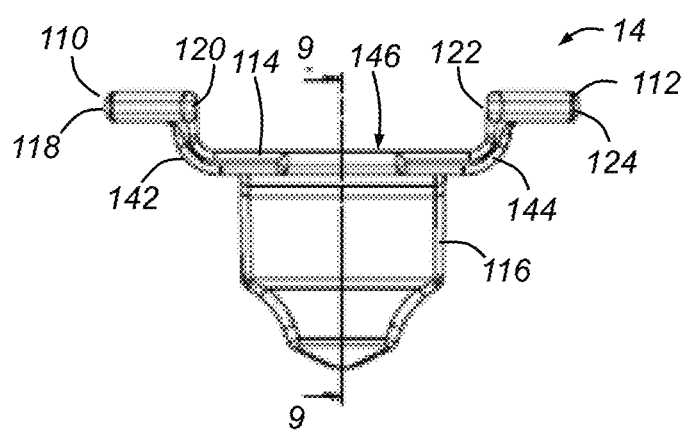
FIG. 8 is an end view of the retainer of FIG. 7.
Figure 9:
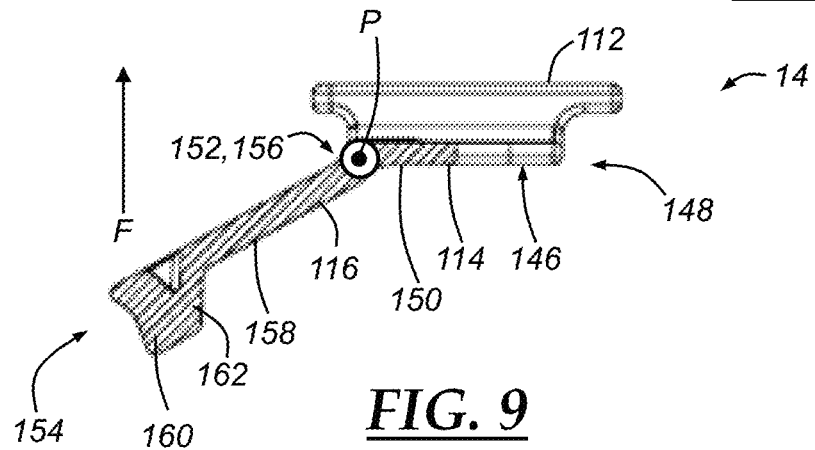
FIG. 9 is a sectional view of the retainer of FIG. 7 cut along line 9-9.

With reference to FIGS. 7-9, there is shown an example of the retainer 14, which is a resilient component that is located between the attachment plate 12 and the fitting 18 and is designed to help retain the table leg TL in place once it has been installed and to help absorb tolerances within the connection assembly 10. According to one example, the retainer 14 includes a first prong 110, a second prong 112, a cross-piece 114 connected to both the first prong 110 and the second prong 112, and a retaining tab 116 connected to the cross-piece 114. The retainer 14 may be comprised of plastic or a resin material, a metal or a metal alloy, or any other suitably resilient material (according to some non-limiting examples, retainer 14 can be injection molded or cast from a plastic, such as a nylon (with or without glass fibers), acrylonitrile butadiene styrene (ABS) and/or some other durable yet sufficiently ductile plastic material). The first prong 110 and the second prong 112 may be mirror images of one another. The first prong 110 and the second prong 112 are each shaped as an elongated plate that includes two side edges 118, 120 and 122, 124 that each extend between a first edge 126, 128 located at a first end 130, 132 and a second edge 134, 136 located at a second end 138, 140 of the respective prong 110, 112. For each of the first and second prongs 110, 112, the first edge 126, 128 is generally perpendicular to the side edges 118-124 and the second edge 134, 136 is angled relative to the side edges 118-124 (e.g., at about a 45° angle relative to the edges 120, 122). The first prong 110 is configured to slide into the first slot 92 and the second prong 112 is configured to slide into the second slot 94 so that the retainer 14 can be at least somewhat secured within the receiving portion 32 of the attachment plate 12.

The cross-piece 114 is connected to the first prong 110 via a first curved portion 142 and to the second prong 112 via a second curved portion 144. The cross-piece 114 also includes a curved slot 146 that is inset within a front side 148 of the cross-piece 114 and that is aligned with the through-hole 84 of the recessed portion 58 when the retainer 14 is installed within the attachment plate 12. The cross-piece 114 also includes a bottom surface 150. The retaining tab 116 extends from a first end 152 to a second end 154, where the first end 152 is located at a rear side 156 of the cross-piece 114. The retaining tab 116 is angled relative to a plane in which the first and second prongs 110, 112 reside as the retaining tab 116 extends from the first end 152 to the second end 154. In the illustrated embodiment, and as is best shown in FIG. 9, this angle may be between 15°-45°, inclusive, and, even more preferably, between 25°-35°, inclusive, (e.g., about 29°), although other angles may certainly be used instead. The retaining tab 116 is a tab- or handle-like extension that may include a bottom surface 158 and a retaining protrusion 160 for engagement. The retaining protrusion 160 includes an inward-facing wall 162 and two outward-facing walls 164, 166 that may be arranged in a triangular configuration. As will be discussed more below, the retaining tab 116 with its retaining protrusion 160 are designed to help maintain the table leg TL in place once it has been attached to the rest of the connection assembly 10. The retaining tab 116 is resilient and is configured to flex or rotate about a retaining tab pivot point P when the retaining protrusion 160 is forced upward by a user during insertion of the table leg TL, as shown by the arrow F in FIG. 9. This permits the fitting 18, which would already be installed in the top surface $TL_{TOP}$ of the table leg TL, to be slid into the slot 60 of the receiving portion 32 against the retainer 14, which would already be installed inside of the receiving portion 32. In this way, features of both the retainer 14 and the fitting 18 share the same slots or channels 92, 94 so that the retainer and 14 and fitting 18 are both secured to the receiving portion 32 of the attachment plate 12. The insertion of the fitting 18, in this way, creates a resilient or spring force (acting in the downward direction, opposite to the arrow F) so that, after installation of the table leg, the retaining tab 116 exerts a force against the fitting 18 that helps absorb or take up tolerances within the connection assembly 10 and keep the components thereof tightly in place. This arrangement can help establish the snap-fit connection mentioned above.

In some embodiments, the curve portions 142, 144 may permit the retainer 14 to be somewhat crushed or otherwise deformed when the fitting 18 is inserted into the receiving portion 32 of the attachment plate 12 so that a tight fit is formed between the attachment plate 12, the retainer 14, and the fitting 18. In such an embodiment, for example, the retainer 14 may be slid into the receiving portion 32 of the attachment plate 12 first, and then the fitting 18 may be forced into the receiving portion 32 so that the fitting 18 presses on the bottom surface 150 of the cross-piece 114 so as to force the cross-piece 114 toward the first prong 110 and second prong 112, which results in deformation of the retainer 14 and that serves to increase the snap-fit connection strength between the fitting 18 and the attachment plate 12. In at least one embodiment, the curved portions 142, 144 of the retainer 14 permit or promote this deformation. In other embodiments, the retainer 14 may include additional crush ribs, tabs, or other deformation promoting features.

With reference to FIGS. 10-15, there is shown an example of the fitting 18, which is a small piece that is inserted into an end of the support member or table leg TL and mates with the receiving portion 32 of the attachment plate 12 so that the table leg TL can be secured to the work surface or table top TT. The fitting 18 may be comprised of a plastic or resin material, a metal or metal alloy, or some other suitable material (according to some non-limiting examples, the attachment plate 12 can be cast from of an aluminum-based or a zinc-based material, or it can be laser cut and machined from one or more steel plates or layers that are then attached to one another in a multi-layer form). According to the illustrated embodiment, the fitting 18 is separate from the table leg TL and is configured to be inserted into a hollow end at the top surface $TL_{TOP}$ of the table leg TL. In other embodiments, however, the fitting 18 may be integrally formed with the table leg TL so that a unitary structure comprises the fitting 18 and the table leg TL. In the illustrated embodiment, the fitting 18 includes a bottom side 190, a top side 192, two peripheral sides 194, 196, a rear side 198, and a front side 200.

The bottom side 190 includes a bottom surface 202 that is at least partially planar so that it may abut the top surface $TL_{TOP}$ of the table leg TL in a complementary fashion.

The bottom surface 202 may be hexagonally-shaped. The fitting 18 also includes a protuberance 204 that is L-shaped and that extends downward from the bottom surface 202 at an end located near the rear side 198. The table leg TL includes a corresponding L-shaped cavity (not shown) that is configured to receive the L-shaped protuberance 204 of the fitting 18. According to at least some embodiments, the mating of the protuberance 204 of the fitting 18 and the corresponding cavity of the table leg TL provides a way for an assembler to locate the correct position for connecting the fitting 18 to the table leg TL. At least according to some embodiments, this protuberance 204 provides additional strength to the connection between the fitting 18 and the table leg TL.

The fitting 18 includes a through-hole 206 that extends in a direction of the table leg axis $A_{TL}$ and that is configured to receive the fastener 16 (FIG. 2) that includes a screw shaft 208 and a screw head 210, and that extends along a central axis $A_{16}$. The through-hole 206 is a cylindrical hole that includes a diameter greater than or equal to the diameter of the screw shaft 208 and that is less than the diameter of the screw head 210 so that the fastener 16 is capable of securely holding the fitting 18 to the table leg TL when the fastener 16 is inserted into the through-hole 206 and driven into the table leg TL. The cylindrical surface that defines the through-hole 206 may be smooth or may be threaded. Of course, in other embodiments, other mechanisms for connecting the fitting 18 to the table leg TL may be used, such as adhesives or through integrally forming the fitting 18 and the table leg TL as a single, unitary structure. In one example, the fastener 16 is made of steel.

Figure 12:
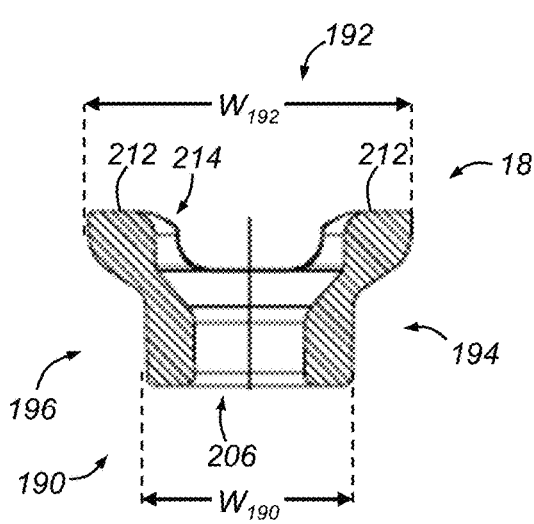
FIG. 12 is a sectional view of the fitting in FIG. 11 cut along line 12-12.
Figure 13:
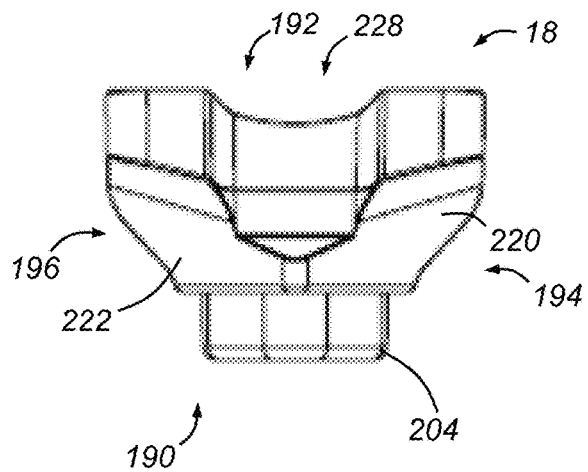
FIG. 13 is a rear end view of the fitting in FIG. 10.
Figure 14:
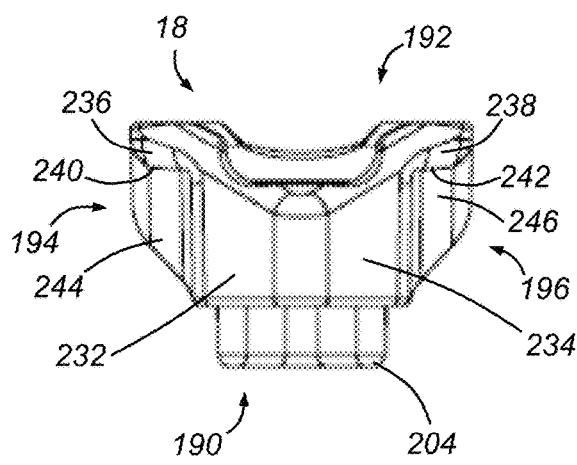
FIG. 14 is a front end view of the fitting in FIG. 10.

The top side 192 includes a top surface 212 that is generally parallel with the bottom surface 202 of the bottom side 190. The through-hole 206 extends through the top surface 212 as is best shown in FIG. 12. A recess 214 is formed within the middle of the top surface 212 that is configured so as to receive the screw head 210 of the fastener 16. As is best shown in FIG. 12, which shows a sectional view of the fitting 18 taken at the section 12-12 (FIG. 11), the width $W_{190}$ of the fitting 18 at the bottom side 190 is less than the width $W_{192}$ of the fitting 18 at the top side 192. The top side 192 also includes two ramping surfaces 216, 218 that are angled relative to the plane in which the top surface 212 resides; in the illustrated embodiment, the two ramping surfaces 216, 218 are inclined at an angle between 20°-40°, inclusive, or, even more preferably, between 25°-35°, inclusive, (e.g., about 29°) (FIG. 15), which corresponds to the angle at which the exterior ramping surface 78 is inclined, as discussed above.

Figure 10:
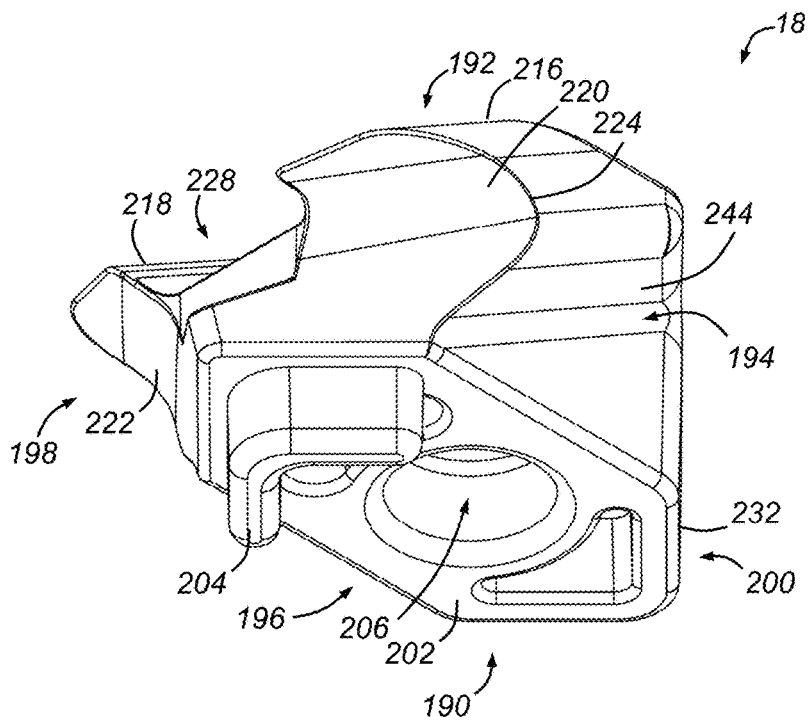
FIG. 10 is an isometric view of a fitting that may be used with the connection assembly of FIG. 2.
Figure 11:
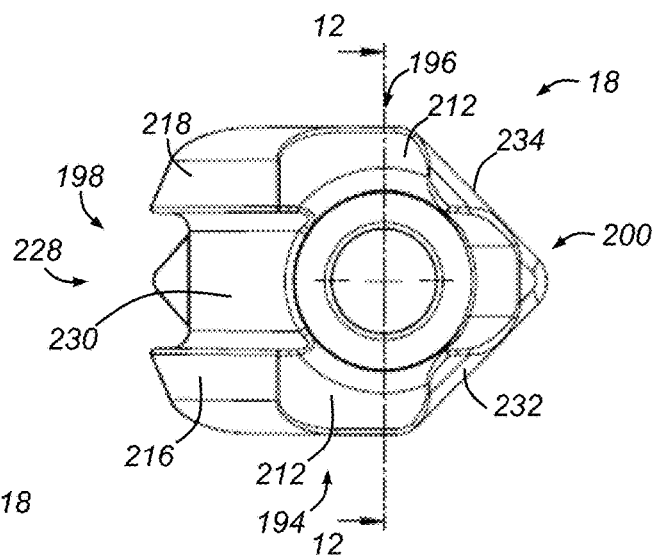
FIG. 11 is a top view of the fitting in FIG. 10.
Figure 15:
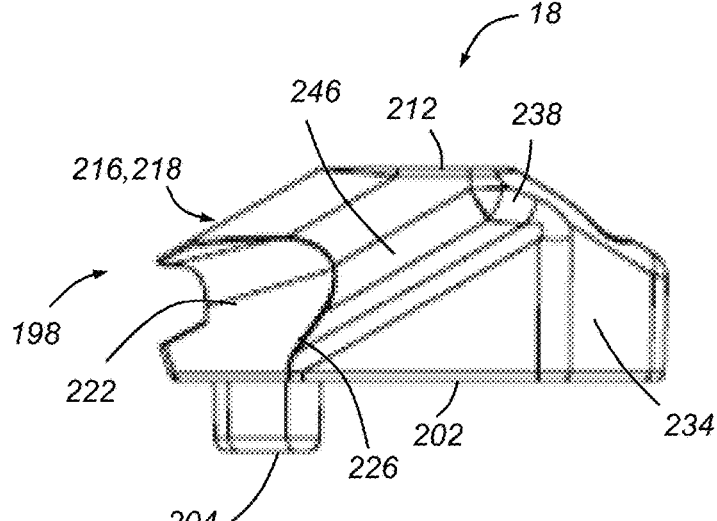
FIG. 15 is a side view of the fitting in FIG. 10.

The rear side 198 includes two curved surfaces 220, 222 that each extends between the bottom surface 202 and a respective one of the two ramping surfaces 216, 218. The two curved surfaces 220, 222 are concaved as is best shown in FIG. 10 and FIG. 15. The two curved surfaces 220, 222 each includes a peripheral side edge 224, 226 that is curved. A slot 228 is disposed between the two ramping surfaces 216, 218 and between the two curved surfaces 220, 222. The slot 228 includes a recessed surface 230 that extends from the top surface 212, starting at a location proximate to the through-hole 206, toward the rear side 198, ending at a location proximate to the bottom side 190 at a point at which the two curved surfaces 220, 222 converge.

The front side 200 includes two front surfaces 232, 234 that extend upward from the bottom surface 202 and toward the top side 192. The two front surfaces 232, 234 merge into two flanges 236, 238 that each includes a downward-facing surface 240, 242 and which is opposed on an opposite side of the respective flanges 236, 238 from the top surface 212. When the fitting 18 is slid into the slot 60 of the attachment plate 12, interference between the first and second inner walls 62, 64 and the flanges 236, 238 prevent the fitting 18 from being dislodged from the receiving portion 32 (FIG. 16).

The two peripheral sides 194, 196 each include a peripheral surface 244, 246 that extend between the bottom surface 202, the top surface 212, a respective one of the peripheral side edges 224, 226, a respective one of the two front surfaces 232, 234, and a respective one of the two flanges 236, 238. The distance between the peripheral surfaces 244, 246 decreases as the peripheral surfaces 244, 246 extend from the rear side 198 to the front side 200.

With reference to FIG. 16, there is shown an example of the connection assembly 10 connecting or attaching the support member TL to the work surface TT. The fastener 16 holds and secures the fitting 18 to the support member or table leg TL, and interference between the first and second inner walls 62, 64 and the flanges 236, 238 prevents the fitting 18 from being dislodged from the receiving portion 32 of the attachment plate 12. The retainer 14 is thereby trapped between the fitting 18 and the attachment plate 12 and is also prevented from being dislodged. When the connection assembly 10 is assembled, the center axis $A_{84}$ of the through-hole 84, the center axis $A_{TL}$ of the table leg TL, and the center axis $A_{16}$ of the fastener 16 may be aligned so that they are all generally co-axial with one another. This arrangement permits the connection assembly 10 to have an increased strength when compared to table leg connections that do not have a fastener 84 used for securing an attachment plate to a table top that is aligned with the center axis $A_{TL}$ of the table leg TL and/or the center axis $A_{16}$ of the fastener 16.

Figure 17:
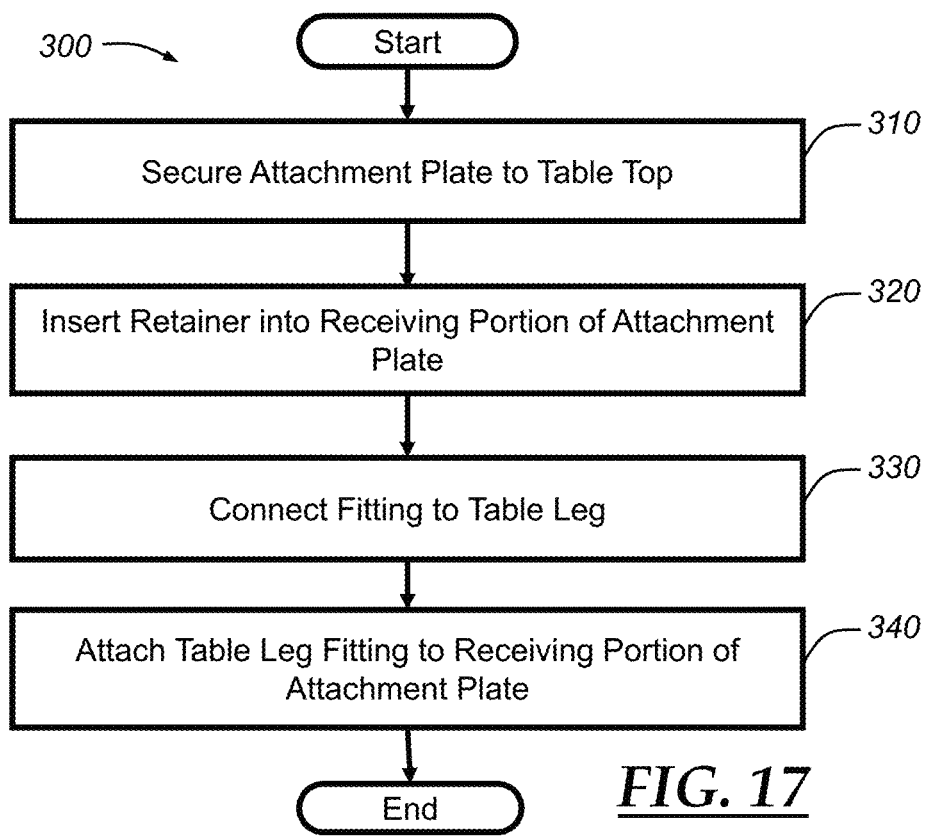
FIG. 17 is a flowchart that shows the steps of a first method for connecting a support member to a work surface, such as connecting a table leg to a table top.

With reference to FIG. 17, there is shown a first example of a method 300 for connecting a support member to a work surface with the use of a connection assembly. Although the description of the method 300 refers to connection assembly 10, it should be appreciated that the method 300 may be used with other table leg connection assemblies that are within the spirit of the foregoing discussion. The method 300 begins with step 310, wherein the attachment plate 12 is secured to the work surface, such as the table top TT of the table T The attachment plate 12 may be secured to the table top TT by placing screws within each of the six through-holes 40A-F of the plate portion 30 and the through-hole 84 of the receiving portion 32. The screws may be driven by a drill or a screwdriver upward through each of the seven through-holes 40A-F, 84 and into the table top TT, which may be comprised of wood or particle board. In other embodiments, such as where the table top TT is metal, threaded holes may already be provided within the bottom surface $TT_{BOTTOM}$ of the table top TT at positions corresponding to those of the seven through-holes 40A-F, 84 of the attachment plate 12. In such an embodiment, bolts or screws may be inserted through through-holes 40A-F, 84 of the attachment plate 12 and threaded into the threaded holes in the table top TT, thereby securing the attachment plate 12 to the table top TT. The method 300 continues to step 320.

In step 320, the retainer 14 is inserted into the receiving portion 32 of the attachment plate 12. In one embodiment, the first prong 110 and the second prong 112 of the retainer 14 are slid into the corresponding slots 92, 94 of the receiving portion of the attachment plate 12. In another embodiment, step 320 is carried out before step 310 so that the retainer 14 is already inserted into the receiving portion 32 of the attachment plate 12 prior to securing the attachment plate 12 to the table top TT. The method 300 continues to step 330.

In step 330, the fitting 18 is connected to the support member or table leg TL. In some embodiments, the fastener 16 is inserted through the through-hole 206 of the fitting 18 and through the top surface $TL_{TOP}$ of the table leg TL so that the fastener 16 holds the fitting 18 to the table leg TL. In one embodiment, the fastener 16 is driven by a drill or screwdriver through the top surface $TL_{TOP}$ of the table leg TL. In another embodiment, the fastener 16 is threaded into a threaded through-hole that is within the table leg TL; such an embodiment may be preferable when the table leg is comprised of metal. The method 300 then continues to step 340.

In step 340, the fitting 18, which is attached to the table leg TL, is inserted into the receiving portion 32 of the attachment plate 12. In one embodiment, this step includes urging the retaining tab 116 upward (e.g., by manually engaging the retaining tab and pressing it in the direction of arrow F in FIG. 9) so that the retaining tab 116 pivots about the pivot point P and the fitting 18 is able to be slid into the slot 60 of the receiving portion 32. As the retaining tab 116 is being deformed and held in the upward position, the top side 192 of the fitting 18 is slid along the exterior ramping surface 78 and into the slot 60 of the receiving portion 32 so that interference between the first and second inner walls 62, 64 and the flanges 236, 238 prevent the fitting 18 from being dislodged from the receiving portion 32. After the retaining tab 116 is released, the retaining tab 116, through the resilient force of the retainer 14, pivots downward (e.g., by manually releasing the retaining tab so that it can move counter to the direction of arrow F of FIG. 9) about the pivot point P such that the retaining protrusion 160 pushes against the rear side 198 of the fitting 18 and helps maintain it in place and/or prevents the fitting 18 from becoming dislodged. As explained above, the force exerted by the retainer 14 on the fitting 18 helps absorb or take up tolerances within the connection assembly 10 so that the assembly feels tight and secure (the vector for this force F may be generally parallel to the center axis of the table leg $A_{TL}$, although this is not required). The method 300 then ends. It should be appreciated that method 300 may include any number of different steps and/or sequences of steps and is not limited to the specific example that is shown in FIG. 17 and is described herein. For instance, it is possible for a user to release or remove the table leg TL from the table top TT, by simply pressing down on the retaining tab 116 and releasing some of the force F, manually grasping the table leg TL, and manipulating the table leg TL so that the fitting 18 can be removed or detached from the receiving portion 32. Other examples are certainly possible.

In one embodiment, a connection assembly kit may be provided to a user. The connection assembly kit may comprise a partially-assembled connection assembly 10 in which the fitting 18 is already connected to the support member or table leg TL and in which the attachment plate 12 is already connected to the work surface or table top TT. The retainer 14 may already be installed within the receiving portion 32 of the attachment plate 12. The connection assembly kit may be provided to a user, who can carry out step 340 so as to form a snap-fit connection by connecting the table leg to the table top and can do so without the use of any tools.

Turning now to FIGS. 18-23, there is shown a second example of a connection assembly 410. Like the previous example, connection assembly 410 may be used to connect one or more support members, such as table legs TL, to a work surface, like table top TT. The connection assembly 410 may include an attachment plate 412, a retainer 414, a fastener 416, and a fitting 418 and is similar to the first example previously described. In terms of the first and second connection assembly examples, like reference numerals represent like features and the description of the first example applies to the second example as well, unless stated otherwise.

Attachment plate 412 is a flat plate that is screwed to the bottom or underside $TT_{BOTTOM}$ of table top TT so that it can securely receive the table leg TL. Like the previous example, attachment plate 412 generally includes a plate portion 430 and a receiving portion 432, and the receiving portion may be located in one of the corners of the plate portion in order to align with the table leg TL. The plate portion 430 may have an upper surface 434, a lower surface 436, four peripheral surfaces 438A-D, and through-holes 440A-F. The upper and/or lower surface may be flat or planar, as shown with the lower surface 436, or they may be non-planar with channels, standoffs and ribs formed during a casting process or the like, as illustrated with the upper surface 434 in FIG. 18.

The receiving portion 432 is a boss-like feature that protrudes from the lower surface 436 of the plate portion 430 so that it can receive the top surface $TL_{TOP}$ of the support member or table leg TL. The receiving portion 432 may include a first wall 450, a second wall 452, a third wall 454, a fourth wall 456, and a recessed portion 458, where the various walls make up at least a portion of the raised perimeter of the receiving portion 432 and the recessed portion 458 provides an opening or slot 460 in the raised perimeter such that the retainer 414 can engage the fitting 418, as will be described. With the walls 450-456 extending from the plate portion 430, the receiving portion 432 may act as a flange or rim that strengthens the connection between the work surface TT and the support member TL.

The recessed portion 458 is an opening or gap in the walls of the receiving portion 432 and thereby provides access between an exterior portion 474 that is disposed outside of the walls 450-456 and an interior portion 476 that is disposed inside of the walls 450-456. The exterior portion 474 may include an opening 478 that can be in the form of a through-hole that completely passes through the attachment plate 412, or it can be a recess or depression that it is slightly sunken into the attachment plate 412 but does not completely pass through. In either event, opening 478 is sized and shaped to rotatably receive the retainer 414 so that the retainer can be rotated or twisted between locked and unlocked positions, as will be explained. According to the non-limiting example shown in FIG. 23, the recessed portion 458 is located at one of the corners of the receiving portion 432, namely the corner of side walls 452 and 454, and the recessed portion 458 blends or merges with the opening 478. This creates a combined or merged opening that includes both a gap in the walls of the receiving portion 432 (i.e., recessed portion 458) and an opening in the plate portion 430 (i.e., opening 478) and allows the retainer 414 to rotatably engage the fitting 418 so that the table leg TL can be locked into the receiving portion 432. It is also possible to provide some indicia 482 next to opening 478 (e.g., the words "RELEASE LEG" or a symbol) that helps explain the operation of the connection assembly 410.

The interior portion 476 includes a surface 480 that is generally parallel to the upper surface 434 and/or the lower surface 436 of the plate portion 430 and includes a through-hole 484 that extends completely through the attachment plate 412. A fastener, such as a screw or bolt, may be inserted through the through-hole 484 and into the table top TT so as to secure the attachment plate 412 to the table top TT in the area of the receiving portion 432. The through-hole 484 may be located in the surface 480 so that a center axis of the through-hole 484 is aligned and is generally co-axial with the center axis $A_{TL}$ of the table leg TL when the connection assembly 410 is installed.

Figure 20:
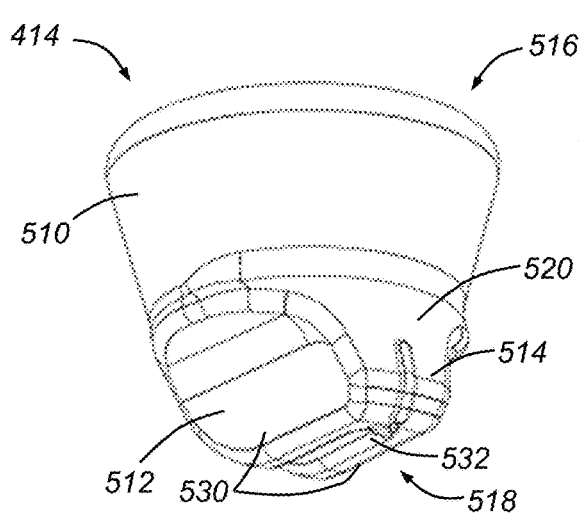
FIG. 20 is an isometric view of a retainer that may be used with the connection assembly of FIG. 18.
Figure 21:
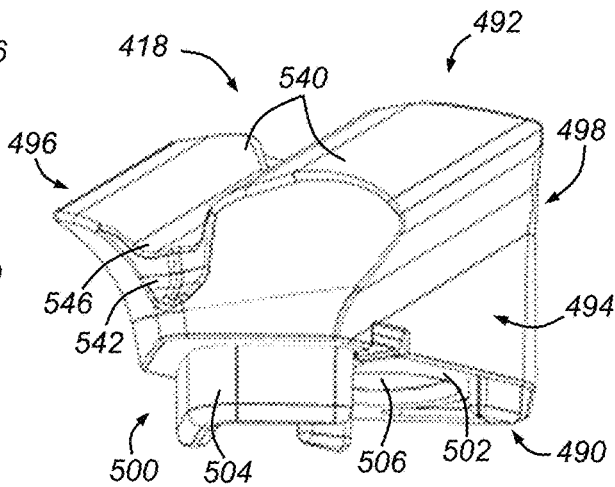
FIG. 21 is an isometric view of a fitting that may be used with the connection assembly of FIG. 18.

With reference to FIG. 20, there is shown an example of the retainer 414, which is designed to rotate between locked and unlocked positions in order to secure and release the table leg TL as needed. The retainer 414, which is a twist-lock type feature, is at least partially located between the attachment plate 412 and the fitting 418. As used herein, "at least partially located between" means any arrangement where at least some part of the retainer, as measured along a straight line, is located between some part of the attachment plate and some part of the fitting (it does not require the entire retainer to be completely located between the attachment plate and the fitting). For example, as illustrated in FIG. 22C, a part of the retainer 414 is located between the attachment plate 412 and the fitting 418, as measured along straight line L, such that the retainer is at least partially located between these two parts. The retainer 414 may be in the shape of a rotatable knob or dial and include a base portion 510, an engagement portion 512, and a locking portion 514. The retainer 414 may be comprised of plastic or a resin material, a metal or a metal alloy, or any other suitably hard material (according to some non-limiting examples, retainer 414 can be injection molded or cast from a plastic, such as a nylon (with or without glass fibers), acrylonitrile butadiene styrene (ABS) and/or some other durable yet sufficiently ductile plastic material). The base portion 510 may be conical in shape such that it has a circular cross-section and a diameter that is greatest at an upper end 516. This flared, conical design allows the retainer 414 to be rotatably installed within the opening 478 of the attachment plate 412 such that it will not fall out once assembled, but still allows the retainer to be rotated between locked and unlocked positions (see FIGS. 22A-22C).

The engagement portion 512 is preferably located at a lower end 518 of the retainer 414 and is designed to provide a user with a grip so that the retainer can be easily rotated or turned. In the non-limiting example shown in FIG. 20, the engagement portion 512 has a pair of indentations 530 formed on opposing sides in order to create a narrower part of the retainer 414 that makes it easier for a user to grasp and turn the part. Any number of additional features, such as slotted feature 532, can be provided to further improve the rotation of the retainer 414. Slotted feature 532 is simply a slot or channel that is formed in the lower end 518 and is sized to receive a coin, which the user can use to more easily rotate the retainer 414 between locked and unlocked positions.

Locking portion 514 may be any type of projection that extends outwardly from the retainer 414 so that when the retainer is rotated into a locking position, such as the position shown in FIG. 22C, the locking portion pushes against the fitting 418 and helps secure the table leg TL to the receiving portion 432. In this sense, the retainer 414 exerts a force F on the fitting 418 that helps absorb or take up tolerances with the connection assembly 410 and make the assembly feel tighter and more secure (the vector for this force F may be generally perpendicular to the center axis of the table leg $A_{TL}$, although this is not required). According to the illustrated example, the locking portion 514 is a cam, lobe or shoulder that extends from a side of the retainer 414, near where the base portion 510 meets the engagement portion 512. The size and shape of the locking portion 514 should be such that when the retainer 414 is rotated to an unlocking or release position, such as that shown in FIGS. 22A-22B, the locking portion 514 is out of the way and allows the table leg TL and the fitting 418 to be removed from the attachment plate 412, and when the retainer 414 is turned to a locking position, like that of FIG. 22C, the locking portion 514 nests within a complementary recess of the fitting 418 such that the table leg TL and fitting are locked in place. It may be advantageous for the locking portion 514 to have a smooth cam surface 520 on its side so that, when the retainer 414 is rotated into or out of the locked position, the cam surface can make sliding contact across a similarly smooth cam follower surface on the fitting 418. Rotation of the retainer 414 into the locked position causes the locking portion 514 to contact and exert a force F against the fitting 418 that helps retain the components of the connection assembly 10 tightly in place. One or more detents, interference fits or other features could be added to the retainer 414 and/or the fitting 418 to assist with this design.

The fitting 418 is a small piece that is inserted into an end of the support member or table leg TL and mates with the receiving portion 432 of the attachment plate 412 and/or the retainer 414 so that the table leg TL can be secured to the table top TT. According to the illustrated embodiment, the fitting 418 includes a bottom side 490, a top side 492, two peripheral sides 494, 496, a rear side 498, and a front side 500. The bottom side 490 includes a bottom surface 502 that is at least partially planar so that it may abut the top surface $TL_{TOP}$ of the table leg TL in a complementary fashion. The fitting 418 also includes a protuberance 504 that extends downward from the bottom surface 502 and is designed to fit within a corresponding cavity in the upper end of the table leg TL (not shown). Fitting 418 may also include a throughhole 506 that extends through the bottom surface 502 in a direction of the table leg axis $A_{TL}$ and is configured to receive the fastener 416 (with or without additional hardware, such as bushings, spacers, washers, etc.). The throughhole 506 enables the fitting 418 to be securely fastened to the top of the table leg TL.

The top side 492 of the fitting 418 is shaped and sized so that it can nest or mate with the receiving portion 432 of the attachment plate 412. Thus, the exterior contours of the top side 492 may be designed to be complementary in nature to the interior contours of the receiving portion 432 so that the fitting 418 can tightly nest within the attachment plate 412, as shown in FIGS. 22B-22C. The peripheral sides 494, 496 may join the front side 500 and form one or more lobes 540 with a pocket or undercut 542 formed therebetween. In one embodiment, an overhang 546 is located above the undercut 542, which helps retain the fitting 418 within the attachment plate 412 when the retainer 414 is rotated to a locked position, as will be explained. The lobes 540 and/or the undercut 542 may include a smooth cam follower surface that slidingly interacts with the corresponding cam surface of the retainer 414. As best shown in FIGS. 22C and 23, when the retainer 414 is rotated to the locked position, the locking portion 514 nests within the pocket or undercut 542 and urges the fitting 418 against the receiving portion 432 in such a way that the table leg TL is securely attached to the attachment plate 412. To release the fitting 418, and hence the table leg TL, a user rotates the retainer 414 to the unlocked position (see FIGS. 22A and 22B) so that the locking portion 514 is no longer pressing up against the fitting 418, which in turn allows the fitting and the table leg TL to be removed. It should be pointed out that it is not necessary for the locking portion 514 to be part of the retainer 414 and for the undercut 542 to be part of the fitting 418, as this arrangement could be reversed so that the locking portion is part of the fitting and the undercut is part of the retainer. Furthermore, it is not necessary that the retainer 414 be rotatable, as the retainer could be slidable or otherwise movable in order to exert a force against the fitting 418. Other alternatives are possible as well.

With reference to FIG. 24, there is shown a second example of a method 600 for connecting a support member to a work surface through the use of a connection assembly. Although the description of method 600 is particularly applicable to connection assembly 410, it should be appreciated that method 600 may be used with other connection assemblies that connect support members to work surfaces. The method 600 begins with step 610, wherein the attachment plate 412 is secured to a work surface of a piece of furniture, such as the underside of table top TT, according to a process that is similar to that described above in connection with step 310. One difference between these two steps is that, in step 610, the retainer 414 is already installed in the opening 478 in the attachment plate 412 when the attachment plate is fastened to the underside of the table top TT. Accordingly, once step 610 is complete, the retainer 414 is rotatably secured within opening 478 such that it can rotate between locked and unlocked positions. As illustrated in FIGS. 22(A)-22(C), the conical shape of the base portion 510 prevents the retainer 414 from simply falling out of the opening 478.

In step 630, the fitting 418 is connected to the support member or table leg TL. Fastener 416 is used to fasten or secure the fitting 418 to an end of the table leg TL and may do so according to any number of different embodiments. For instance, the fastener 416 could be threaded into corresponding threads in the fitting 418 and/or the table leg TL, with or without additional hardware. The various techniques described in connection with step 330 could be employed here as well.

Turning now to step 640, the fitting 418, which is securely attached to the table leg TL, is inserted into the receiving portion 432 of the attachment plate 412. This step is preferably carried out when the retainer 414 is in an unlocked position so that the locking portion 514 is turned to an out of the way position that does not interfere with the insertion of the fitting 418, as illustrated in FIGS. 22A-22B (notice how the protrusion or lobe on locking portion 514 is turned away from the fitting 418, this is the unlocked position). Following step 640, the fitting 418 will be nested within the receiving portion 432, but it will not necessarily be locked in place.

In step 650, the retainer 414 is rotated from an unlocked position to a locked position so that fitting 418 remains securely captured within the receiving portion 432 of the attachment plate 412, as shown in FIG. 22C. As the locking portion 514, which is a protrusion or lobe extending outwardly from the retainer 414, is rotated or twisted into the locked position, a cam surface on the locking portion 514 slides across a corresponding cam follower surface on the fitting 418 until the locking portion 514 settles into the pocket or undercut 542. Once in this position, the locking portion 514 exerts a force F against the fitting 418 that urges the fitting into an even tighter and more intimate connection with the receiving portion 432. This helps maintain the fitting 418, and hence the support member or table leg TL, in place and/or prevents the fitting 418 from being accidentally dislodged. It also helps absorb or make up for tolerances in the various parts so that the connection assembly feels solid and secure. When the retainer 414 is in the locked position, the locking portion 514 extends into the undercut 542 and, together with the overhang 546, prevents the fitting 418 from slipping out of the receiving portion 432; this could be the case even if the locking portion 514 is not exerting a substantial force F on the fitting 418.

It should be appreciated that method 600 may include any number of different steps and/or sequences of steps and is not limited to the specific example that is shown in FIG. 24 and is described herein. Other examples are certainly possible.

As with the previous method, a connection assembly kit may be provided to a user. The connection assembly kit may comprise a partially-assembled connection assembly 410 in which the fitting 418 is already connected to the support member or table leg TL and in which the attachment plate 412, which has retainer 414 pre-installed in opening 478, is already connected to the bottom surface of the work surface or table top TT. A user can then carry out steps 640 and 650 to form an interference-fit, as described, and can do so without the need for any tools.

With reference to FIGS. 25-27, there is shown an example of a stability enhancement element 550 that is designed to reduce rattles, vibrations, noise, etc. within the connection assembly. The stability enhancement element 550 is optional and could be added to any of the connection assembly examples disclosed herein, including connection assemblies 10 and 410 (FIG. 25 happens to show the stability enhancement element added to connection assembly 410, but it is not limited to such). The stability enhancement element 550 may be made from any number of suitable plastic or other synthetic materials (according to some non-limiting examples, element 550 can be injection molded or cast from a plastic, such as a nylon (with or without glass fibers), acrylonitrile butadiene styrene (ABS) and/or some other durable yet sufficiently ductile plastic material). One such example is the glass fiber reinforced polyamide or nylon known as PA6 GF30. According to the illustrated embodiment, the stability enhancement element 550 is a thin, elongated component that includes a center span 552 and a pair of side attachments 554, 556. The center span 552 may include a number of parallel ribs 558 that extend along most or all of the length of the center span and can help reduce vibrations in the component. On each end of the center span 552, is an integrally formed side attachment 554, 556, which are small pieces that help attach or anchor element 550 to some part of the connection assembly. It is possible for each of the side attachments 554, 556 to have a snap-fit or interference-fit type of locking feature to help with the attachment.

The stability enhancement element 550 may be attached to the bottom side 490 of the fitting 418 and, more particularly, it may be inserted into a channel 560 that is formed in the bottom surface 502 of the bottom side 490. The channel 560 is sized and shaped to receive the stability enhancement element 550 and even extends beyond the bottom surface 502 so as to wrap around the sides of the fitting, see side anchors 562, 564. The side attachments 554, 556 engage and lock into the side anchors 562, 564, respectively, so that the stability enhancement element 550 can be securely fastened to and, to at least some degree, vibrationally coupled to the fitting 418. When the fitting 418 is attached to the support member TL (not shown in FIG. 25), such as by fastener 416, the stability enhancement element 550 will be interposed between the bottom side 490 and the top surface $TL_{TOP}$ of the support member, thereby helping to dampen or otherwise suppress rattles, vibrations, noise, etc. between the two parts. Because the stability enhancement element 550 is located in recessed channel 560, it does not negatively interfere with or prevent a flush connection between the fitting 418 and support member TL.

Of course, it is not required that the stability enhancement element 550 be located in the exact location shown in the drawings, as it could alternatively be located in a different position between the fitting 418 and the support member TL, or it could even be located between different components of the connection assembly. For instance, it is possible for one or more stability enhancement elements to be interposed between a top side 492 of the fitting 418 and an interior portion 476 of the attachment plate 412 and such elements may be provided in lieu of or in addition to element 550. An example of such a stability enhancement element 570 is shown in FIG. 18, where a center span 572 extends between a pair of side attachments 574, 576. Center span 572 is a bit wider than center span 552 and may even include a partial cutout to accommodate one of the screws that secures the attachment plate 412 to the underside of the work surface or table top TT. Other features and arrangements are certainly possible, including ones where stability enhancement elements 550 and 570 are both employed.

Turning now to FIGS. 28-29, there is shown a third example of a connection assembly 610. The connection assembly 610 may be used to connect one or more of the table legs TL to the bottom surface $TT_{BOTTOM}$ of the table top TT. According to this particular example, the connection assembly 610 is a hem-plate design and includes an attachment plate 612, a retainer 614, a fastener 616, and a fitting 618. Attachment plate 612 is connected to the bottom surface $TT_{BOTTOM}$ of the work surface or table top TT and includes a plate portion 630 and a receiving portion 632. Like the previous examples, plate portion 630 may include a number of through-holes for screws or other fasteners to secure the attachment plate 612 to the work surface. The receiving portion 632 includes one or more curled or folded flanges that extend from one or more edges of the plate portion 630 in order to receive corresponding edges of the fitting 618.

Fastener 616 may be used to attach fitting 618 to a top surface of the support member or table leg TL. The fitting 618 differs somewhat from the previous examples in that it includes a flat plate portion 640 that is generally the same shape and size as the plate portion 630 of the attachment plate 612. With the plate portion 640 only connected to the table leg TL at one of its corners, it extends from the table leg in a somewhat cantilevered fashion.

The retainer 614 may be provided as a handle bolt having both a handle portion 650 and a bolt portion 652. Once the attachment plate 612 is secured to the underside of the work surface or table top TT and the fitting 618 is secured to the top of the support member or table leg TL via fastener 16, the fitting 618 can be maneuvered into place such that its edges are provisionally captured by the turned flanges of the receiving portion 632. After proper alignment of these components, the bolt portion 652 can be manually inserted through a through-hole 660 in the plate portion 640 and threaded into a hole 662 in the plate portion 630 and/or the work surface TT in order to firmly secure the fitting 618 to the attachment plate 612. It is preferable that the location of the retainer 614 be diagonally opposite or kitty-corner to the location where fastener 616 attaches the fitting 618 to the support member TL; this helps distribute the forces that secure the fitting 618 in place. Elongated filler rods 670 with a semi-circular cross-sectional shape may be inserted towards the front of the turned flanges of the receiving portion 632 for better stability. In FIG. 29, support member or table leg TL is securely attached to work surface or table top TT by connection assembly 610.

In FIGS. 30-31(C), there is shown a fourth example of a connection assembly 710 that is of a hem-plate design and is similar to the previous embodiment, except that the connection assembly connects a pair of table legs TL to a table top TT and does so at a non-perpendicular angle to the table top. In this example, the connection assembly 710 includes an attachment plate 712, several retainers 714, and a fitting 718. Attachment plate 712 is connected to the underside of the work surface or table top TT and includes a plate portion 730 and a receiving portion 732, similar to attachment plate 612. One difference with the previous embodiment is that receiving portion 732 only includes a single curled or folded flange along one edge of the attachment plate 712, as opposed to two folded flanges along two edges.

It is possible for the fitting 718 to be integrally formed with the pair of support members or table legs TL (e.g., the fitting and tables legs could all be made from a unitary piece of metal-based or plastic-based material). In a different embodiment (not shown), the fitting could be a separate part that is connected to the pair of table legs TL with one or more fasteners, as in the previous examples. The fitting 718 includes a flat plate portion 740 that is generally the same shape and size as the plate portion 730 of the attachment plate 712. The pair of table legs TL converge in a V-shape towards a center of the flat plate portion 740.

Each of the retainers 714 may be provided as a handle bolt having both a handle portion 750 and a bolt portion 752. Once the attachment plate 712 is secured to the underside of the work surface or table top TT (FIG. 31(A)), the fitting 718 can be maneuvered into place such that an edge of the plate portion 740 is slipped under and provisionally captured by the turned flange of the receiving portion 732 (FIG. 31(B)). After proper alignment of these components, both of the retainers 714 can be manually inserted in through-holes 760 in the plate portion 740 and threaded into holes 762 in the plate portion 730 and/or the work surface TT in order to firmly secure the fitting 718 to the attachment plate 712. In the illustrated example, each of the retainers 714 can be located in a corner on the opposite side of the plate portion 740 as the receiving portion 732; this helps distribute the forces that secure the fitting 718 in place. An elongated filler rod 770 with a semi-circular cross-sectional shape may be inserted towards the front of the turned flange of the receiving portion 732 for better stability. In FIG. 31(C), the pair of angled support members or table legs TL are securely attached to work surface or table top TT by connection assembly 710.

It is to be understood that the foregoing is a description of one or more preferred example embodiments of the invention, and the figures are examples that are not necessarily to scale. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "for example," "e.g.," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation. In addition, the term "and/or" is to be construed as an inclusive OR. Therefore, for example, the phrase "A, B, and/or C" is to be interpreted as covering all of the following: "A"; "B"; "C"; "A and B"; "A and C"; "B and C"; and "A, B, and C."

The invention claimed is:

1. A connection assembly for connecting a support member to a work surface, comprising:
   an attachment plate that includes a plate portion and a receiving portion, the plate portion is configured for attachment to the work surface;
   a fitting that includes a top side and a bottom side, the top side is received by the receiving portion of the attachment plate and the bottom side is configured for attachment to the support member; and
   a retainer that is at least partially located between the attachment plate and the fitting, wherein the retainer exerts a force on the fitting that helps absorb or take up tolerances within the connection assembly so that the support member is securely connected to the work surface, wherein the receiving portion is a boss-like feature that protrudes from the plate portion and includes a plurality of walls that receive the top side of the fitting, wherein the receiving portion further includes an exterior portion located outside the plurality of walls, an interior portion located inside the plurality of walls, and a recessed portion that forms an opening in at least one of the plurality of walls and provides access between the exterior and interior portions, and wherein the exterior portion includes an opening that rotatably receives the retainer to facilitate rotation of the retainer between locked and unlocked positions.

2. The connection assembly of claim 1, wherein the plate portion is a flat plate that includes a plurality of through-holes for fasteners that attach the attachment plate to a bottom surface of the work surface, one or more of the plurality of through-holes are located at one or more corners of the plate portion.

3. The connection assembly of claim 1, wherein the plurality of walls include a first wall that is aligned with a first peripheral surface of the plate portion and includes a first end and a second end, a second wall that is aligned with a second peripheral surface of the plate portion and includes a first end and a second end, a third wall that is aligned at an angle to the first wall and includes a first end, and a fourth wall that is aligned at an angle to the second wall and includes a first end, the first end of the first wall is connected to the first end of the second wall, the second end of the first wall is connected to the first end of the third wall, the second end of the second wall is connected to the first end of the fourth wall, and the recessed portion is located between the third and fourth walls.

4. The connection assembly of claim 1, wherein the interior portion includes a through-hole for a fastener that attaches the attachment plate to a bottom surface of the work surface, the through-hole is located at an outside corner of the attachment plate and has a center axis that is generally co-axial with a center axis $A_{TL}$ of the support member.

5. The connection assembly of claim 1, wherein the recessed portion is merged with the opening to create a combined opening that includes both a gap in one or more of the plurality of walls of the receiving portion and a through-hole in the plate portion, the through-hole in the plate portion allows the retainer to rotate and the gap in the one or more walls allows the retainer to contact and exert the force on the fitting that helps absorb or take up tolerances within the connection assembly.

6. The connection assembly of claim 1, wherein one of the fitting or the retainer has a locking portion in the form of a projection and the other of the fitting or the retainer has an undercut, when the retainer is in the locked position the locking portion engages the undercut and causes the top side of the fitting to be pressed tightly into the receiving portion of the attachment plate so that the support member is securely connected to the work surface, and when the retainer is in the unlocked position the locking portion does not engage the undercut and allows the support member to be released from the work surface.

7. The connection assembly of claim 6, wherein the retainer is a rotatable knob and includes a base portion, the base portion has a circular cross-sectional shape and is rotatably mounted within an opening in the attachment plate so that it can rotate between the locked and unlocked positions.

8. The connection assembly of claim 6, wherein the retainer is a rotatable knob and includes an engagement portion, the engagement portion has a slotted feature for receiving a coin or the like so that a user can more easily rotate the retainer between the locked and unlocked positions.

9. The connection assembly of claim 6, wherein the retainer is a rotatable knob and includes the locking portion, the locking portion is a lobe or projection that extends outwardly from the retainer and includes a cam surface that slides across a cam follower surface on the fitting.

10. The connection assembly of claim 6, wherein the fitting includes a through-hole for a fastener that connects the fitting to the support member and has a first center axis, the receiving portion of the attachment plate includes a through-hole for a fastener that attaches the attachment plate to an underside of the work surface and has a second center axis, and the first center axis is generally co-axial with the second center axis.

11. A connection assembly for connecting a support member to a work surface, comprising:
an attachment plate that includes a plate portion and a receiving portion, the plate portion is configured for attachment to the work surface;
a fitting that includes a top side and a bottom side, the top side is received by the receiving portion of the attachment plate and the bottom side is configured for attachment to the support member; and
a retainer that is at least partially located between the attachment plate and the fitting, wherein the retainer exerts a force on the fitting that helps absorb or take up tolerances within the connection assembly so that the support member is securely connected to the work surface, wherein the bottom side of the fitting includes a protuberance that extends from the bottom side, the protuberance is configured to fit into a corresponding cavity in an end of the support member.

12. The connection assembly of claim 11, wherein the top side of the fitting includes a first flange and a second flange, the first and second flanges insert into a slot within the receiving portion of the attachment plate so that the receiving portion retains the fitting.

13. The connection assembly of claim 11, wherein the top side of the fitting includes an exterior contour that is complementary in size and shape to an interior contour of the receiving portion of the attachment plate so that the fitting tightly nests within the receiving portion.

14. The connection assembly of claim 11, wherein the fitting includes an undercut that is sized and shaped to receive a locking portion of the retainer so that when the retainer is in a locked position the locking portion nests within the undercut and prevents the fitting from becoming displaced from the receiving portion of the attachment plate.

15. The connection assembly of claim 11, further comprising a stability enhancement element that is interposed between two components in the connection assembly and is configured to reduce rattles, vibrations and/or noises therebetween.

16. The connection assembly of claim 15, wherein the stability enhancement element is made from a plastic material and includes a center span and at least one side attachment on an end of the center span, one of the two components in the connection assembly includes a channel that is sized and shaped to receive the stability enhancement element and an edge, the center span extends in the channel so as to avoid negatively interfering with the connection between the two components, and the side attachment grasps on to the edge to help maintain the stability enhancement element in place.

17. The connection assembly of claim 11, wherein the connection between the support member and the work surface is a fixed-leg connection, as opposed to a foldable connection, and the connection assembly is configured so that the support member can be released from the work surface without the use of any tools.

18. An assembly kit, comprising:
   a support member in the form of a table leg;
   a work surface in the form of a table top; and
   the connection assembly of claim 11, wherein the attachment plate is attached to an underside of the table top with a plurality of screws and the fitting is attached to a top surface of the table leg with a fastener.

19. A connection assembly for connecting a support member to a work surface, comprising:
   an attachment plate that includes a plate portion and a receiving portion with an opening, the plate portion is configured for attachment to the work surface;
   a fitting that includes a top side and a bottom side, the top side is received by the receiving portion of the attachment plate and the bottom side is configured for attachment to the support member; and
   a retainer that is rotatably installed within the opening of the attachment plate so as to rotate between locked and unlocked positions, wherein one of the fitting or the retainer has a locking portion in the form of a projection and the other of the fitting or the retainer has an undercut, when the retainer is in the locked position the locking portion engages the undercut and causes the top side of the fitting to be pressed into the receiving portion of the attachment plate so that the support member is securely connected to the work surface, and when the retainer is in the unlocked position the locking portion does not engage the undercut and allows the support member to be released from the work surface.

* * * * *